(12) United States Patent
Koselka et al.

(10) Patent No.: US 7,854,108 B2
(45) Date of Patent: *Dec. 21, 2010

(54) AGRICULTURAL ROBOT SYSTEM AND METHOD

(75) Inventors: Harvey Koselka, Trabuco Canyon, CA (US); Bret Wallach, San Diego, CA (US)

(73) Assignee: Vision Robotics Corporation, San Diego, CA (US)

(*) Notice: Subject to any disclaimer, the term of this patent is extended or adjusted under 35 U.S.C. 154(b) by 981 days.

This patent is subject to a terminal disclaimer.

(21) Appl. No.: 11/354,548

(22) Filed: Feb. 15, 2006

(65) Prior Publication Data

US 2006/0213167 A1     Sep. 28, 2006

Related U.S. Application Data

(63) Continuation-in-part of application No. 11/009,909, filed on Dec. 9, 2004, now Pat. No. 7,765,780.

(60) Provisional application No. 60/481,781, filed on Dec. 12, 2003.

(51) Int. Cl.
    *A01B 69/00* (2006.01)

(52) U.S. Cl. ........................... 56/10.2 A; 701/50

(58) Field of Classification Search .............. 56/10.2 R, 56/10.2 A, 328.1, DIG. 7
    See application file for complete search history.

(56) References Cited

U.S. PATENT DOCUMENTS

| | | | |
|---|---|---|---|
| 4,482,960 A | 11/1984 | Pryor | |
| 4,519,193 A | 5/1985 | Yoshida et al. | |
| 4,663,925 A | 5/1987 | Terada | |
| 4,769,700 A | 9/1988 | Pryor | |
| 4,975,016 A | 12/1990 | Pellenc et al. | |
| 4,994,970 A | 2/1991 | Noji et al. | |
| 5,185,991 A | 2/1993 | Klinner | |
| 5,438,817 A | 8/1995 | Nakamura | |
| 5,560,190 A | 10/1996 | Ottaway | |
| 5,859,696 A | 1/1999 | Nicholas et al. | |
| 5,957,304 A | 9/1999 | Dawson | |
| 5,974,348 A | 10/1999 | Rocks | |
| 6,052,647 A | 4/2000 | Parkinson et al. | |
| 6,199,000 B1 | 3/2001 | Keller | |
| 6,374,538 B1 | 4/2002 | Morris et al. | |
| 6,415,229 B1 | 7/2002 | Diekhans | |
| 6,517,281 B1 | 2/2003 | Rissi | |
| 6,525,276 B1 | 2/2003 | Vellidus et al. | |
| 6,608,672 B1 | 8/2003 | Shibusawa et al. | |
| 6,671,582 B1 | 12/2003 | Hanley | |

*Primary Examiner*—Alicia M Torres
(74) *Attorney, Agent, or Firm*—ARC IP Law, PC; Joseph J. Mayo

(57) ABSTRACT

An agricultural robot system and method of harvesting, pruning, culling, weeding, measuring and managing of agricultural crops. Uses autonomous and semi-autonomous robot(s) comprising machine-vision using cameras that identify and locate the fruit on each tree, points on a vine to prune, etc., or may be utilized in measuring agricultural parameters or aid in managing agricultural resources. The cameras may be coupled with an arm or other implement to allow views from inside the plant when performing the desired agricultural function. A robot moves through a field first to "map" the plant locations, number and size of fruit and approximate positions of fruit or map the cordons and canes of grape vines. Once the map is complete, a robot or server can create an action plan that a robot may implement. An action plan may comprise operations and data specifying the agricultural function to perform.

17 Claims, 17 Drawing Sheets

Scout

Scout

Harvester

Hand

AGRICULTURAL ROBOT SYSTEM AND METHOD

This patent application takes priority from U.S. Provisional Patent Application Ser. No. 60/481,781 filed Dec. 12, 2003 entitled "Robot Mechanical Picker" and is a continuation in part of U.S. Utility patent application Ser. No. 11/009,909 to Koselka et al., entitled "Agricultural Robot System and Method" filed Dec. 9, 2004 now U.S. Pat. No. 7,765,780, the specifications both of which are hereby incorporated herein by reference.

BACKGROUND OF THE INVENTION

1. Field of the Invention

Embodiments of the invention described herein pertain to the field of robots. More particularly, but not by way of limitation, embodiments of the invention enable an agricultural robot system and method of robotic harvesting, pruning, culling, weeding, measuring and managing of agricultural crops.

2. Description of the Related Art

The use of robots to automate tasks performed by people is increasing. Robots provide several important benefits over human labor including improved efficiency, less expense, more consistent and higher quality work performed, and the ability to perform hazardous work without endangering people. Individually and collectively, these benefits help businesses increase margins and profits, which is essential for maintaining competitiveness.

Agriculture is one industry with traditionally low profit margins and high manual labor costs. In particular, harvesting can be expensive. For some crops, such as tree fruit, harvesting labor represents the growers' single largest expense, up to 50% of total crop cost. Increasing labor costs and labor shortages threaten the economic viability of many farms. Therefore, replacing manual labor with robots would be extremely beneficial for harvesting. Additional benefits could be obtained through automating other tasks currently done manually such as pruning, culling, thinning, spraying, weeding, measuring and managing of agricultural crops.

GPS controlled automated tractors and combines already operate in wheat and other grain fields. Automated harvesters exist that can blindly harvest fruit by causing the fruit to drop from a plant into a collection device. For example, Korvan Industries, Inc. makes equipment than shakes oranges, grapes, raspberries, blueberries, etc. off plants. These harvesting approaches have wide scale applicability, but are not applicable to the harvesting of all crops.

For example, while oranges may be harvested en mass by shaking the tree, this method only works for the fruit that will be processed. Shaking cannot be used for picking oranges sold as fresh, i.e. table fruit. The violent nature of this harvesting technique can bruise the fruit and tear the skin, which is both unappealing to the consumer and causes the fruit to rot quickly.

Thus, whole tree harvesting approaches comprising "shaking," are inappropriate for picking fresh fruits and vegetables such as apples, pears, tomatoes and cucumbers that are to be sold as whole fruit. A different approach is required, one in which each piece of fruit is picked individually.

People have attempted to develop mechanical pickers to pick whole fruits for years. For example, Pellenc, a French manufacturer, built a prototype orange picker, but abandoned the project. One common failure mode for these picking systems was that they could not locate fruit located on the inside of the tree that cannot be seen from outside the canopy. To date, no equipment exists that can pick fresh fruits and vegetables efficiently enough to compete with human labor in cost or yield. Furthermore, machines have been used in an attempt to hedge grape vines. Hedging grape vines provides a rough cut to the vines that blindly shapes the vines. The final pruning of the canes on the grape vines is non-trivial and is best performed using a holistic view of the grape vine and planning before pruning is attempted. To date, no known machines are configured to intelligently perform the final pruning of grape vines. Known final pruning methods utilize humans operating pruning devices by hand. In addition, there are no known systems that scout and pre-plan harvesting, pruning, culling or other agricultural functions. Similarly to harvesting and pruning, automating other tasks such as thinning, spraying, culling, weeding, measuring and managing of agricultural crops can lower costs and increase consistency and quality.

A farmer's main inventory is the crop in the field. Managing that inventory requires knowledge about that inventory such as the count, size, color, etc. of the crop on each tree, bush, or vine. To date, farmers estimate these parameters from relatively small samples taken by manual observation that are prone to errors when projecting parameters of the entire crop. Because of the time, cost, and effort required to do these estimates, farmers often do not even perform these estimates. Satellite imagery has recently enabled macro-level estimates of some of these crop parameters such as tree vigor, crop ripeness by color, or the presence of certain diseases. While this is useful information, it does not provide data at the individual tree/bush/vine level. For at least the reasons detailed in this section, there is a need for an agricultural robot system and method.

BRIEF SUMMARY OF THE INVENTION

Embodiments of the invention enable an agricultural robot system and method of harvesting, pruning, thinning, spraying, culling, weeding, measuring and managing of agricultural crops. One approach for automated harvesting of fresh fruits and vegetables, pruning of vines, culling fruit, thinning of growth or fruit buds, selective spraying and or fertilizing, weeding, measuring and managing of agricultural resources is to use a robot comprising a machine-vision system containing cameras such as rugged solid-state digital cameras. The cameras may be utilized to identify and locate the fruit on each tree, points on a vine to prune, weeds around plants. In addition, the cameras may be utilized in measuring agricultural parameters or otherwise aid in managing agricultural resources. Autonomous robot(s) or semi-autonomous robot(s) coupled with a tractor, trailer, boom or any combination thereof comprise embodiments of the invention. In one embodiment of the invention a robot moves through a field and uses its vision system and other sensors to "map" the field to determine plant locations, the number and size of fruit on the plants and the approximate positions of the fruit on each plant. In addition a map can contain the location of branches to be pruned, fruit to be culled, buds to be thinned, etc. at the individual tree/bush/vine level as well as for the entire field. Maps can also contain other data such as tree vigor, pest infestation, state of hydration, etc. that is associated with each plant in the field. A robot employed in these embodiments may additionally comprise a GPS sensor or other external navigational aids to simplify the mapping process. The function of taking data which is used to create the map(s) may also be called scouting. In this case, if a robot performs primarily this function, it may be called a Scout robot. If the function is performed on a robot as part of a more complex series of functions, then this function may be called the Scouting function or Scouting part of the robot. The following terms may be used interchangeably and their usage is not meant to limit the intent of the specific design feature: plants, vines and trees; fruits and vegetables; and fields, orchards and groves.

Once the map(s) are prepared, the robot or another robot or server can create an action plan that the robot or another robot can then implement generally by moving and using articulated arms or other task-specific actuators, such as a selective sprayer to implement an agricultural function under the direction of a processor system. An action plan may comprise operations and data specifying picking, pruning, thinning, spraying, culling, measuring, or any other agricultural function or combination thereof. The vision system may be coupled with a picking system or other task specific actuators to capture data from various locations in and around each plant when performing the picking or desired agricultural function.

In one embodiment of the invention, an agricultural robot gathers data and then determines an action plan in advance of picking, pruning, thinning, spraying, or culling a tree or a vine. This may be done if the map is finished before the robot is scheduled to harvest or prune, or if the action plan algorithm selected requires significant computational time and cannot be implemented in "real time" by the robot as it is picking, pruning or culling plants in a field. If the algorithm selected is less computationally intense, the robot may generate the map and calculate the plan as it is harvesting, culling, thinning, spraying or pruning for example. When picking, the system harvests according to the selected picking plan. The robot may also plan a cull, so that apple trees for example may be culled in order to ensure that the apples that are not culled that remain on the tree mature and become larger than if all of the apples on a tree were allowed to mature. Any combination of picking, pruning, culling, thinning, spraying, weeding, measuring or any other agricultural activity may form part of the action plan.

In one embodiment of the invention, the robot does not perform any mechanical task. Its sole function is the collection of data from the field to enable the farmer to more efficiently plan and manage his crop. The robot may be called upon to collect data multiple times during a growing season with multiple or different sensor sets attached. This data may be used to predict future crop performance in order to optimize factors such as fertilizer input, zones to pick, timing of maturity, etc., which will result in improved profitability.

An agricultural robot may comprise zero or more actuators or articulating arms coupled with a self-propelled automated platform or coupled with a tractor, trailer or boom. An arm may be configured or coupled with an implement configured to pick, prune, cull, thin, spray, weed, take samples or perform any other agricultural task that is desired. Each arm may include one or more cameras and/or an embedded processor to accurately locate and reach each piece of fruit/vegetable, and an end effector which provides further action. The end effector may be a mechanical hand that grabs and picks fruit, or may contain some mechanical cutting or thinning device, some type of spraying mechanism, or any other device or implement to perform an agricultural function or observation or measurement. The end effector may also contain a mechanism to cut or snip the fruit from the stem rather then just pulling it free. The system may comprise two or more different style arms incorporated into the robot in order to reach the fruit on different parts of the tree or to perform different agricultural functions independent of the other arm or dependent upon the other arm, e.g., one arm may be configured to move branches so that another arm may be allowed to pick or cull fruit for example. The robot may pull or carry loading bins, into which it may load the picked fruit. In addition the robot may work with bins that are handled by a separate means not attached to the robot. Harvest bins may comprise any device that is capable of holding picked fruit such as a basket, a bushel, a box, a bucket or any other agricultural fruit repository. Bins may be left in the field or transported to the robot one at a time. Packaging may be performed at the robot or at any other location utilizing an embodiment of the robot or any other machine to which the robot may transport agricultural items. In an alternative embodiment of this invention, the end effector(s) is/are not mounted on an articulating arm (such as directly to the robot's frame or on a non-articulating arm).

Alternate embodiments of an agricultural robot may comprise semi-autonomous robot(s) that may be coupled with a tractor, boom or trailer for example coupled with an extension link to allow for movement along or about the axis of tractor travel at a velocity other than that of the tractor. Robots are mounted on a tractor, boom or trailer in one or more embodiments of the invention which eliminates or minimizes the drive mechanisms in the robots used in autonomous self-propelled platforms. Robots that are not self-propelled are generally smaller and cheaper. In addition, most farms have tractors that may be augmented with robots, allowing for easy adoption of robots while minimizing capital expenditures. Some farms may require a driver to physically move robots for safety or other concerns. One or more embodiments utilize a scout and/or harvester mounted on a tractor. Alternatively or in combination a trailer comprising a scout and/or harvester may be coupled with a tractor. A boom may also be utilized as a mount point for a scout and/or harvester alone or in combination with a tractor and/or trailer, and the boom may be mounted in the front of the tractor, sides of the tractor, rear of the trailer or sides of the trailer. A power source such as a generator may be mounted on the tractor, boom or trailer and may make use of the tractors power-take-off unit. The power source may be utilized in powering any robots coupled with the tractor, trailer or boom. Embodiments of the robot may obtain power from the tractor's hydraulic system as well.

Boom mounted robots may be driven or move themselves along the boom in order to provide relative speed and position control of the robot with respect to the tractor. In one or more embodiments the trailer may comprise a cable or tether that allows for the trailer as a whole to control its own position relative to the tractor. Alternatively an embodiment may provide speed control of the tractor from the scout robot on the tractor, trailer or boom to eliminate the need to pay out or retract cable to adjust the trailer position. Tractors provide for slow driving speeds and depending on the algorithms used by the scout and harvester robots may not require adjusting the speed of the tractor or distance from the trailer to the tractor. Automatic steering systems may also be employed to eliminate the need for a driver to drive the robots, unless desired at the end of rows or due to safety concerns for example.

Any utility provided by robots coupled to a tractor, trailer or boom may be used individually or with the knowledge of the actions and capabilities of the other robots so coupled. For example, two agricultural robots, e.g., a scout robot and a harvester or worker robot (which can pick, prune, cull, thin, spray, sample or perform any other agricultural task) may be utilized on one tractor, trailer or boom and make use of information or capabilities provided by the other. Each robot may be mounted in a manner that allows the robot to delay movement, or catch up to the tractor in order to perform a task at a given location and then move back into standard position.

Embodiments of the invention pre-map the individual fruit/vegetable size, color, and/or locations on the plant and pre-plan a picking sequence. Similarly, a pruning, culling, thinning, or spraying sequence or any other function may be preplanned. Using simple algorithms, or with sufficient processing power preplanning may not be required since the appropriate actions can be planned in real time. Without pre-planning, in scenarios utilizing complex algorithms, the functional robot system operates significantly less efficiently; slowing the task by a factor of up to four or more and potentially not performing the assigned task as effectively as if it were pre-planned. Harvesting robots heretofore have not employed pre-planning and therefore have not operating efficiently enough to justify the cost of the system. When multiple arms are used to increase the speed of a function, the need for pre-planning is even greater.

Using oranges as an example, an agricultural robot configured for picking, i.e., a picking robot, is provided a map comprising the number and approximate locations of oranges in each specific region of a tree. The map may originate from a scout robot, or other source whether robotic or not or any other system capable of producing a map such as a computer system that is configured to generate a map from photographs. An embodiment of the picking plan provides the direction for the robot to locate itself or another robot near the tree based on the map, determines which arms to use in each tree region and specifies the optimal picking order for the fruit in that region. Since the orange locations are not static, i.e. they move in the wind and rise as other oranges are picked from the same branches, each picking arm may include one or more cameras. The arm may be pointed in the direction of the next orange to pick, or may use its own vision based guidance system to locate and pick that orange. When the oranges are arranged in a cluster, the robot may pick the closest orange in the cluster, even if it is not the one for which it was initially programmed. Because the robot may pre-map the grove and know how many oranges are in the cluster, the picking plan may include all the arm motions required to pick all the fruit in the cluster.

Alternatively, using vines as an example, an agricultural robot configured for pruning, i.e., a pruning robot, may prune vines that are typically planted in rows on trellises. Typically vines are planted every 2 meters or so and are trained to grow along a single vertical trunk. When the trunk reaches the proper height, two side branches known as cordons are trained to grow along a trellis wire orthogonal to the trunk. The cordons are grown a meter or so until they almost touch the cordon of the next vine. The vine rows are generally 3 or 4 meters across. The pruning process is non-trivial in that the whole vine is taken into account before pruning. The process generally involves removing all canes except the "best" eight which are pruned at a certain bud. The "best" canes include canes that are evenly spaced at the cordon, growing vertically, having a base off of previous fruiting canes, etc. Hence, the pruning process involves observing the entire cordon before selecting the best eight before pruning the remaining canes. A picking robot may be used as a pruning robot for example if an arm of the picking robot comprises a cutting or pruning implement.

While a single robot may encompass the entire robot system, one or more embodiments of the invention use multiple robots for example a low cost scout robot and one or more task specific robots for example. One advantage of this embodiment is that the scout can map and create the picking plan in advance of the task specific worker robots arriving at the plant for picking, pruning or any other agricultural function that the task specific robot is configured for. The scouting robot may perform its function at a significantly faster rate, allowing it to cover more area and plan for more than one task specific robot. Separating the scouting and task specific robots allow both to operate almost continuously, maximizing the efficiency and cost effectiveness of the system of deployed robots. It is also possible to configure the task specific robots to perform multiple tasks. For example, a task specific robot can prune in the winter, cull in the spring, spray in the summer and pick in the fall. The schedule listed above is for illustrative purposes, and may vary based on actual requirements. Similarly, the robot may include all the different actuators or configured for each of the different tasks.

The multiple robot embodiment can be generalized even further into a network of field robots working together. It is likely that large farms will have multiple sets of robots working simultaneously in order to meet short seasonal, growing cycle, or market demands for large amounts of field work to be done in a relatively short span of time. In this case, there may be significant advantages for the robots to be communicating with one another in order or with a central controlling location which may be a robot or other server. For instance, groups of robots may be deployed in a coordinated fashion according to pre-calculated densities of workload in order to load-balance the work among all robots deployed—thereby increasing the efficiency of the group as a whole. The communication method between robots may be very flexible ranging from wireless, to cellular, satellite, optical, or even audio or ultrasonic.

The mapping process can provide significant growing enhancements even if it is not associated with a functional task. For farmers, a scout essentially performs inventory management by counting and inspecting crops in the field. Depending on the scout's sensors, the robot can detect crop yield, vigor, etc. and aid in determining the harvest schedule among many other applications.

DETAILED DESCRIPTION OF THE INVENTION

Figure 1:
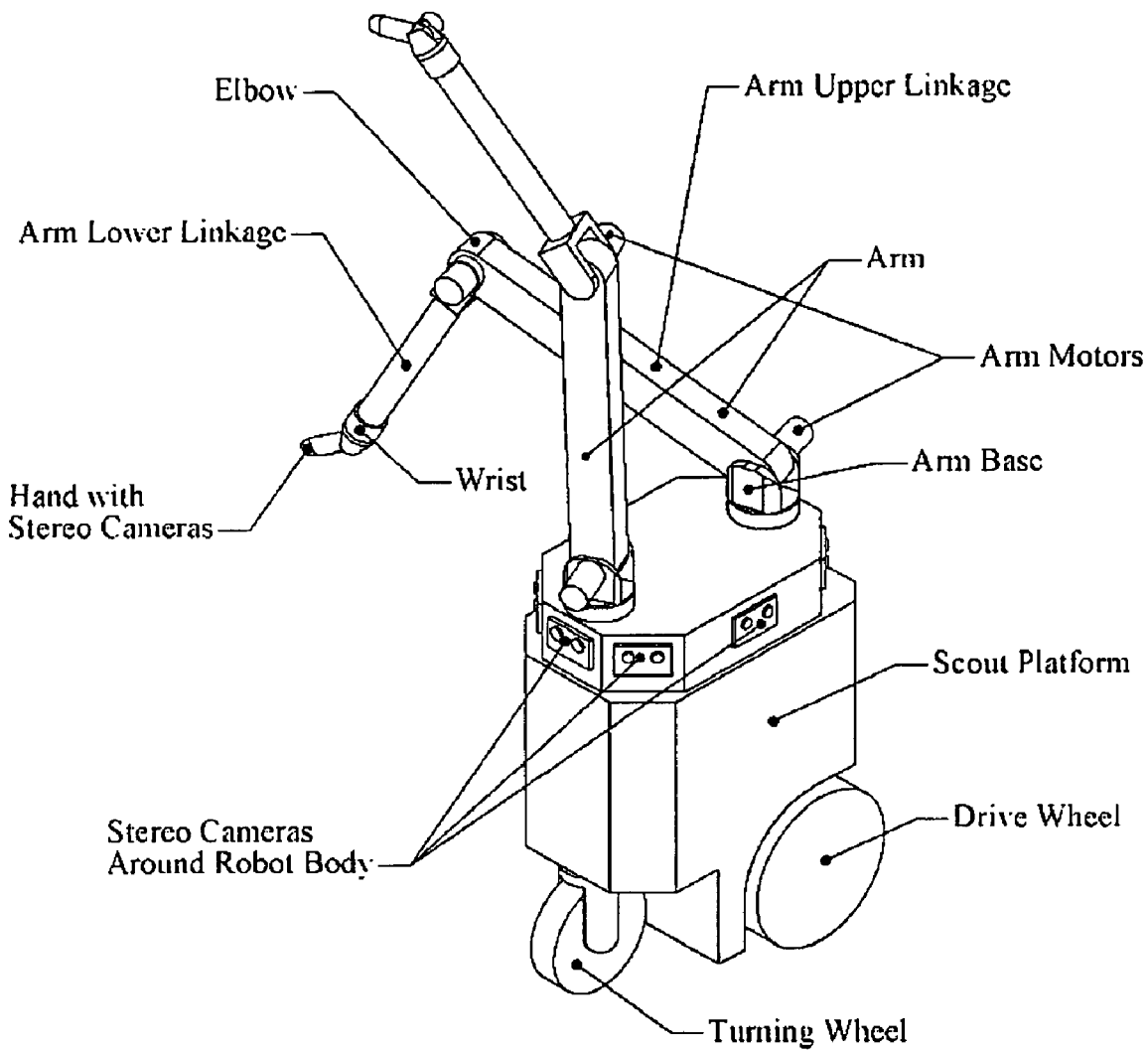
FIG. 1 illustrates an embodiment of a scout robot.

Embodiments of the invention enable an agricultural robot system and method of harvesting, pruning, thinning, spraying culling, weeding, measuring and managing of agricultural crops. One approach for automated harvesting of fresh fruits and vegetables, pruning of vines, culling fruit, weeding, measuring and managing of agricultural resources, etc. is to use a robot comprising a machine-vision system containing cameras such as rugged solid-state digital cameras. The cameras may be utilized to identify and locate the fruit on each tree, points on a vine to prune, weeds around plants. In addition, the cameras may be utilized in measuring agricultural parameters or otherwise aid in managing agricultural resources. The cameras may be coupled with a picking system or other implement to allow views all around and even inside the plant when performing the picking or desired agricultural function. Autonomous robot(s) or semi-autonomous robot(s) coupled with a tractor, trailer, boom or any combination thereof comprise embodiments of the invention. In one embodiment of the invention a robot moves through a field first to "map" the field to determine plant locations, the number and size of fruit on the plants and the approximate positions of the fruit on each plant. Alternatively, a robot may map the cordons and canes of grape vines. In such a case, the map would consist of the location of each cordon, cane, and sucker as well as the location and orientation of buds on each cane. The function of the map is to allow the robot to make intelligent decisions and perform tasks based on what the vision system or other attached sensors detect along with rules or algorithms in the robots software. For instance the robot may choose to pick only fruit meeting a certain size criteria and may optimize the picking order for those fruit. Or the robot may use the map of a grape vine along with rules embodied in its software to prune the vine to the 8 best canes per cordon with 2 buds left on each of those canes. Alternatively, or in addition, the map may be used for other purposes other than functional decisions by the robot. For example, data from the map may be used by the grower to track crop performance and make intelligent decisions about when to harvest or when to prune. Other embodiments gather data applicable to thinning, spraying culling, weeding and crop management. A robot employed in these embodiments may comprise a GPS or other sensor to simplify the mapping process. Once the map is complete for a field, the robot or another robot or server can create an action plan that the robot or another robot can then implement generally by moving and using actuators that may be mounted on articulated arms. These task specific tools enable the robot to implement an agricultural function under the direction of a processor system. An action plan may comprise operations and data specifying picking, pruning, thinning, spraying, culling, measuring, or any other agricultural function or combination thereof. Pre-mapping and pre-planning picking allows for efficient picking and pre-mapping and preplanning for pruning allows for effective pruning. A map may also enable improved farming by providing data even if that data is not acted on by another functional robot.

In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Any mathematical references made herein are approximations that can in some instances be varied to any degree that enables the invention to accomplish the function for which it is designed. In other instances, specific features, quantities, or measurements well-known to those of ordinary skill in the art have not been described in detail so as not to obscure the invention. Readers should note that although examples of the invention are set forth herein, the claims, and the full scope of any equivalents, are what define the metes and bounds of the invention. Agricultural elements as used herein pertain to fruit, vegetables, branches, plants or trees, or any other item found in an agricultural field.

Pre-mapping enables efficient picking. A map can be created either just before harvesting or earlier in the growing season. While navigating through the grove and mapping, a scout robot can gather other useful information including the condition, size, quantity, health and ripeness of the fruit, individual trees and the orchards as a whole. In another embodiment, the scout robot can be equipped with a variety of sensors, including but not limited to cameras, hydration sensors, spectral sensors or filters to sense changes in coloration of the leaves, bark or fruit. Using a semi-autonomous or autonomous robot to carry these sensors may allow the farmer to collect data more frequently, more thoroughly, and/or in a more cost-effective manner than manually deploying sensors or using a costly network of fixed sensors. In addition, the sensor carrying robot may provide more detailed data than airborne or satellite mounted sensors. The sensor data may be stored in a database for later retrieval, analysis and use. This database enables farmers to manage their agricultural resource to improve their yields by altering the actions to be performed based on the measurements observed in the sensor data. For example, this information may be used to:

Selectively pick by sizes to optimize total crop price and profit.

Track crop development during the growing season, yields per tree, sizes and locations, and compare with data taken in earlier years and provide aid to under-performing plants for example.

Detect disease and insect/mite infestations during the growing season, identifying problems before they can be seen with the naked eye.

Measure, map and geo-reference nutrient and hydration status on a tree-by-tree or area-by-area basis.

Determine the amount and timing of watering, fertilizing and spraying for each individual plant in the field.

Over time, this informational database can be used to more accurately predict crop sizes and yields earlier in the growing season and to improve harvesting and marketing strategies. The ability to collect, analyze and report data on tree, grove and crop conditions significantly helps growers to increase both fruit quality and yields while decreasing the amount of water, fertilizer, insecticides and labor required. The collection of this data is useful to farmers even if it is not applicable to a functional robot. Thus, a standalone scout may be utilized as an embodiment of the invention.

The scouting robot may be deployed one or more times during seasons or growing periods of interest. The data acquired by the scout, coupled with the historical data collected for that tree and grove may be used to determine everything from optimal pruning and culling strategies to scheduling the harvest. If an unusual event, such as a frost, excessive rain, drought, high winds, etc., occurs the scout may be sent through the grove again to update the forecasts and picking, culling or pruning plans.

The system and method described herein comprises several advantages.

1. Pre-mapping the tree and the fruit location enables the robot to create an action plan comprising an efficient picking plan. Without a picking plan, it is unlikely the harvester can work efficiently enough to justify its cost relative to hand labor.

- A robot that arbitrarily picks the first piece it sees will have to significantly backtrack to pick all the fruit.
- A robot without a picking plan would attempt to pick a specific piece from its current location with the closest arm regardless of whether a different arm could pick it more easily from a different starting location.
- A robot that does not have a complete picking plan may not know when it is done and would possible utilize time consuming "last looks" around the tree to confirm that it has not missed anything.
- Without a picking plan, a robot harvester may not be able to quickly move multiple picking arms without the arms becoming entangled.

Mapping the fruit or vegetable locations facilitates creating an effective action plan. The map can also include information such as the locations of thick branches the robot cannot move out of the way and, thus, must reach around. The map enables the robot to look at the picking/culling/pruning/thinning/spraying from a holistic, entire tree view, and create an action plan that is significantly more efficient than having the robot operate on the first item it sees. Action plans comprising a pruning plan may be utilized to prune grape vines wherein effectiveness is maximized over efficiency since a grape vine incorrectly pruned will lower the crop output.

2. Pre-planning the Picking, Pruning or other Agricultural Function

Once a tree is mapped, the robot system may determine an optimal action strategy and create an actuator plan and robot motion path, collectively known as an action plan. Creating the action plan may be either simple or complex from both computational and implementation standpoints. Computational complexity is based on how long it takes the robot to determine the action plan once the map is complete. From an implementation standpoint, the optimization of the strategy may require several iterations to determine the relative optimum, and also require tightly controlled positioning and arm/actuator movements. A pre-planned pattern is especially important with the use of multiple arms or actuators on the robot. The plan enables each arm to work without interfering with others. The plan should also balance the actual work between the arms/actuators in order to keep all of the arms and actuators operating as much as possible, which improves the overall picking speed and efficiency. Alternatively, using vines as an example, an agricultural robot may prune vines using an arm motion plan and robot motion path collectively known as a pruning plan that may form part of an action plan. Picking and pruning may occur simultaneously in certain situations. Vines are typically planted in rows on trellises. Typically vines are planted every 2 meters or so and are trained to grow along a single vertical trunk. When the trunk reaches the proper height, two side branches known as cordons are trained to grow along a trellis wire orthogonal to the trunk. The cordons are grown a meter or so until they almost touch the cordon of the next vine. The vine rows are generally 3 or 4 meters across. The pruning process is non-trivial in that the whole vine is taken into account before pruning. The process generally involves removing all canes except the "best" eight which are pruned at a certain bud. The "best" canes include canes that are evenly spaced at the cordon, growing vertically, having a base off of previous fruiting canes, etc. Hence, the pruning process involves observing the entire cordon before selecting the best eight before pruning the remaining canes. The robot may also plan a cull, so that apple trees for example may be culled in order to ensure that the apples that are not culled that remain on the tree mature and become larger than if all of the apples on a tree were allowed to mature. Any combination of picking, pruning, culling, thinning, spraying, weeding, measuring or any other agricultural activity may form part of the action plan.

Depending on the complexity of the action plan, the robots may create the action plan in "real time" as the robot is harvesting, pruning, culling or performing any other agricultural function. Alternatively, for complex maps or action plans that require significant computation, it may not be possible to create an action plan in real time as the action robot is working. In that case there would be a significant advantage to have a scouting robot that maps and pre-plans the process with a sufficient lead time to perform all the necessary calculations for the action plan. If the robot maps the field significantly before the start of the functional task, it may create the action plan at the completion of mapping rather than waiting until the actual harvesting/pruning for example.

Below are listed two examples of different picking plan complexities.

Simple plan that can be created and implemented in real time:

Tomatoes grow on outside of relatively skinny plants, so there are a number of positions where a multiple linkage arm can easily reach all the fruit. For these plants, the robot may create a picking plan in real time as it is harvesting. The plan may include size or ripeness thresholds based on color or color pattern, such that only the ripe tomatoes are picked and the robot comes back the next day or week to pick the rest of the crop. Multi-spectral image analysis may be utilized by the system in order to determine whether a given piece of fruit is ripe or not, and the subtle differences in multi-spectral intensities of color may be preloaded into the robot for a given crop type.

Complex Plan that may be Completed before Picking is Initiated:

Orange trees are large, often up to 16 feet diameter and 16 to 20 feet tall, and the oranges can be located almost anywhere around the outside of the tree or inside the tree's canopy. Each tree may yield several hundred up to a thousand oranges, and as many as 50% of the oranges may be located inside the canopy, which is made up of clusters of oranges, leaves and twigs and thick and thin branches. When picking, the harvester's arms can push through the leaves and twigs that can be moved out of the way, but must work around the more mature branches.

This requires a relatively complex picking strategy and plan that takes a great deal into account. For example, the robot may need to position itself in one or more "optimal" locations around the tree in order to reach all the fruit. If the positioning is not carefully planned, the robot may need to reposition itself several extra times for each tree. Since each move slows the harvest, it is desirable to minimize the number of moves. A specific harvest order may also be required so the arms do not reach past and damage some fruit while reaching for other fruit. Finally, the plan may account for the accessible paths to reach the fruit inside the canopy.

There may also be situations where the robot can section the plant into different harvest regions and begin picking one region as it plans the next region. In one embodiment, the scout and harvester are in the field together with the scout mapping the tree one or more ahead of the tree the harvester is picking. In addition, the picking plan may comprise fruit specific picking times so that multiple passes through a field are utilized in order to pick each fruit at its optimum ripeness level. Culling apples is an example of a complex plan since the proper apples to cull may be located in difficult locations and may utilize size measurements of the apples to create a plan to cull the smallest 30% of the apples for example.

3. Multiple Robot System, the Scout and Functional Robot

Using different robots to map and perform a task enables each to work optimally efficiently. In addition, each robot can be designed and sized appropriately for its individual task. Even if the overall system cost is greater, the two-robot system can be more cost effective because each part can work at its optimal speed and overall cost for each grove reduced. For example, this allows a two-robot system to harvest more trees in a season and thereby reduce the cost per tree. Semi-autonomous robots may be coupled with a tractor in order to provide movement capabilities for the robots.

This case can be generalized even further into any number of multiple robots. In large fields, it would be likely that multiple sets of robots would be working simultaneously in order to meet crop timing requirements (growth cycle, market window, etc.). In this case, an overall scheme may be used to optimize the function of some or all of the robots. For instance, a few scouts working at a more rapid pace may map and determine action plans for a larger number of slower functional robots doing functions such as picking, pruning, spraying, etc. Likewise, more work may be assigned to robots working in denser areas in order to keep the overall workload balanced. The optimization may be done manually based on external data and data gathered by the scouting robots, or it may be done via some type of non-wired communications between robots in the field. One or more robots may act as masters in orchestrating this optimization.

4. Using the Scout Map at a Time other than just before the Harvest

In a normal growing season, the number and relative positions of the fruit does not change significantly in the time leading up to the harvest. Therefore, the scout can map and plan before the various task robots are sent s in the field. This information enables the system to accurately predict crop yields and harvesting times, which, in turn, enables a more informed farming approach. In other words, with this knowledge, the farmer may change the order or the timing of the harvest(s), or other tasks in order to maximize his revenue for the entire crop. As noted earlier if an unusual event occurs, the scout may be sent out to remap the grove before harvest.

5. Using the Scout to Create a Database of Information Including, but not Limited to the Harvesting Plan As described above, the database may include the fruit size to enable efficient size picking if there is a premium for a particular size of fruit. The database would also be able to track the yields for individual trees to determine the more proficient, which may allow the farmer to alter the application of water, fertilizer and spray pesticides on individual trees. This would increase the overall yield, while minimizing the costs because the water and chemical applications are optimized for each individual tree. In addition, fruit may be culled early in the season in order to maximize the number of larger fruit that are obtained later at harvest time. When trees possess too many fruit, the average size of the fruit is smaller and there may be non-linear price differences in fruit counts per bushel that the farmer may opt to target in order to maximize profits.

The scout may also be equipped with sensors to detect disease and insect/mite infestations during the growing season, identifying problems before they can be seen with the naked eye. Different sensors may measure, map and geo-reference nutrient and hydration status. The term geo-reference refers to correlating data with a location. Specifically, geo-referenced data may, for example, comprise data regarding agricultural elements and relating them to absolute locations in the field, to their relative locations on individual plants, or to relative locations between different elements either on a single or different plants. The locations could be determined using any method. One method is to calculate an offset from the platform using at least two on-board cameras (stereo vision). Other sensors and techniques such as laser single cameras and laser range finders may also be used to determine an agricultural element location within a plant. The platform position may be determined using GPS, stereo-vision determination, dead-reckoning from a known point or any other applicable method.

In embodiments employing at least one camera, the at least one camera may be configured to collect data. However, the system may use other sensors to collect the data such as sensors to measure nutrient and hydration status. The geo-referenced data may include information as simple as the location of the agricultural element, it may include details such as the size or ripeness of the fruit. Similarly, it may include data regarding pest infestation, disease, hydration or health of the entire plant of individual elements.

The geo-referenced data may be either immediately used by the system or stored. An example of the former is the grape pruning embodiment. The leading portion of the system, the scout in this embodiment scans the entire cordon to determine the appropriate pruning locations which is implemented by the pruning actuators further back on the system. Alternatively, the geo-referenced data may be stored in a database to aid in managing crop harvests, to enable precision farming, or for any other purpose. The orange harvester represents an embodiment where the scout may map the grove significantly before harvest, so the data is stored, but not necessarily included in the precision farming database.

6. The Use of Cameras or Stereo Camera Pairs on each Mapping and Picking Arm

The scout and task specific robots will include one or more cameras which may be mounted directly on the robot. However, because CMOS cameras are extremely small, low cost and rugged, it is possible to place several directly onto the robot's actuators and arms in addition to the robot bodies. One problem is that the fruit and other plant features are often located inside the canopy of the tree, out of sight from the outside. Therefore, the cameras on the robot body cannot see all of the features of interest on a tree. By contrast, when the robot pushes its arms into the canopy, the cameras mounted on the arms are able to see throughout the inside of the tree.

In addition, mounting lights, such as small powerful LEDs, on the camera assembly may enable the robot to light the dark areas inside the tree, improving the systems' ability to see all the fruit. Additional lighting also enhances the speed of the robot by improving the signal to noise ratio of the camera systems. With more light, camera images may be taken with shorter exposure. This has multiple advantages: 1) Certain functions such as scouting may require thousands of pictures per tree. Shorter exposures allow more pictures per second, reducing the time the robot spends scouting a tree. 2) Shorter exposures reduce the time the robot must be still to avoid motion-blurred pictures. With short enough exposures, it may be possible to continue moving the robot while the picture is being taken. 3) Shorter exposures reduce delays in control systems dependent on the cameras—such as the robotic arms. This allows for faster and more accurate correction of the arms—and therefore faster motion. An embodiment of the invention comprises an air blower to blow the leaves away from the camera's line of sight in order to prevent the leaves from blocking the view. A mounting light may emit one or more frequencies of light, one or more varying frequencies of light or one or more varying frequency bands of light either through use of LEDs or conventional lights and/or hardware or software filters to improve the ability of the system to see within dark areas or observe fruit with frequencies that although subtle to the human eye yield clues as to the ripeness of the fruit. Likewise, camera sensors with different sensitivities to different wavelengths of light may be used with or without selective hardware or software filters to improve the systems sensitivity to particular plant parameters of interest. Examples of enhanced sensitivity include, but are not limited to infrared sensing which may help detect the water stress of plants as well as selective wavelengths that may enhance the selection of a particular ripeness level of a fruit. One or more embodiments of the system may also use a refractometer to sample fruit juice to yield a Brix reading to determine sugar percentage of the fruit. A fruit that is sample for sugar content may also be collected by the robot in order to bring back for further analysis and this may happen if the fruit appears diseased or has been damaged for example. Alternatively, a fruit may be left on the tree and mapped as having been sampled or as being damaged and dealt with at a later time.

As described above, an action plan made in advance can be complete and comprehensive, but it is not exact. For example, if a scout robot created a map intended for use with a harvesting robot mapped a week before harvesting, the plants and fruit will have continued to grow and may not be in the same exact location as when the map was created. Wind also causes the fruit to move, and a branch tends to rise as the weight of the fruit decreases as each piece is picked. Therefore, blindly moving the picking arm to the last known fruit location is not sufficient. Each time an arm reaches for a piece of fruit, the system must individually locate and move the arm to the precise location of that piece of fruit. Cameras mounted on the task-specific robot—whether on its housing or arm(s) allow the robot to react to changes in conditions after scouting.

A stereo pair of cameras on the robots' housing may track the fruit if it is visible from the outside of the tree. However, it is at times more efficient to track the fruit using one or more cameras on the picking arm. The arm reaches inside the tree to pick the fruit, so the camera is able to see the pieces not visible from the outside. Additionally, it may be easier to control the arm using cameras that are closer to the fruit. This allows the robot to use less expensive and complex arms.

Finally, picking some fruits and vegetables requires cutting the stem rather than just grabbing and pulling the piece free. Having a camera near the hand is one possible way to ensure the robot can determine the fruit's orientation, locate the stem and position the cutting tool.

7. Combining Robot Harvesting with Traditional Hand Labor

For example, a robot harvester that only picks oranges located high in the canopy may be economically viable. Field observations have shown that human pickers harvest the lower portion of a tree (fruit that can be reached from the ground) four to ten times faster than they can harvest fruit from the tops of the trees, because continually re-positioning and climbing up and down ladders is a relatively slow process. Therefore, a Top Pick Harvester working in sequence with a small human crew may reduce both the cost and the harvesting time. The Top Picker approach may also require fewer, less complex and less expensive arms since it reaches into the tree from above and does not have to penetrate as far into the tree's interior.

8. Autonomous Selective Picking

A robot picker may efficiently pick fruit of a given size or ripeness to maximize crop value. The process of picking the fruit may be aided by multi-spectral sensing devices. This may involve multiple harvests and readjusting the map in the database to update the status of remaining fruit.

9. Harvesting Robot that Includes Secondary Operations to the Fruit

Some fruit is harvested with long stems such as some tomatoes. Other crops such as oranges require the stem cut flush with the fruit. Due to the location and orientation of the fruit on the tree, it may be difficult to properly cut the stem when the fruit is picked. One alternative is to pick the fruit by cutting the stem at any convenient length, and as fruit is transferred from the picking arm to the bin, a secondary process may be utilized to trim the stem to the proper length.

Similarly, the robot may include a washing or waxing station or virtually any other process to simplify or cost reduce any step of the process of getting the fruit from the field to the store.

10. Robot that Senses Crop Conditions

As described above, the scout or any task specific robot may include sensors to detect a variety of fruit, plant, soil, field or infestation conditions. Such a system provides significant economic benefits to the farmer since it allows the farmer to provide corrective actions before problems become too large or expensive to solve.

11. Robot System that Creates/Uses a Crop Database

The robot can create and maintain a database of information about the crop such as yield, size and ripeness. The database may also include any additional information regarding the crop as described in the previous paragraph above. The farmer can use the database to compare information between years, fields or even individual trees. This database enables farmers to tailor the application of fertilizer, pesticide and water to improve overall crop yield while minimizing cost.

12. Scout Robot Performs a Statistical Sampling of Crops

Prior to harvest, a grower often desires to know the potential yield and status of his crops. The scout may be used to sample a statistical number of plants in a single field or multiple fields. These samplings can then be used to determine the timing of harvest for the fields, and planning the number of containers required, etc.

13. Alternative Embodiments

In another embodiment, the robot divides each tree into a number of regions and maps, plans and performs its function individually in the regions instead of the entire tree. For many crops this is less efficient, but may work well for trees that are large enough that the harvester robot needs to re-position itself several times to complete its task. In this embodiment, for the example of a robot harvesting system, the scout/picker combinations robot may map one region of the tree while it is harvesting another region and continue in a similar manner until the entire tree is harvested. In a multi robot embodiment, two harvesters may navigate down adjacent rows of trees in a grove, and each harvest fruit from its own half of the trees it passes.

Alternate embodiments of an agricultural robot may comprise semi-autonomous robot(s) that may be coupled with a tractor, boom or trailer for example coupled with an extension link to allow for movement along or about the axis of tractor travel at a velocity other than that of the tractor. Robots are mounted on a tractor, boom or trailer in one or more embodiments of the invention which eliminates or minimizes the drive mechanisms in the robots in opposition to autonomous self-propelled platforms. Robots that are not self-propelled are generally smaller and cheaper. In addition, most farms have tractors that may be augmented with robots, allowing for easy adoption of robots while minimizing capital expenditures. Some farms may require a driver to physically move robots for safety or other concerns. One or more embodiments utilize a scout and/or task specific robot mounted on a tractor. Alternatively or in combination a trailer comprising a scout and/or task specific robot may be coupled with a tractor. A boom may also be utilized as a mount point for a scout and/or task specific robot alone or in combination with a tractor and/or trailer. A power source such as a generator may be mounted on the tractor, boom or trailer and may make use of the tractors power-take-off unit. Any utility provided by robots coupled to a tractor, trailer or boom may be used individually or with the knowledge of the actions and capabilities of the other robots so coupled. For example, a scout and task specific robot (which can pick, prune, cull, sample or perform any other agricultural task) may be utilized on one tractor, trailer or boom and make use of information or capabilities provided by the other. Each robot may be mounted in a manner that allows the robot to delay movement, or catch up to the tractor in order to perform a task at a given location and then move back into standard position. In one or more embodiments the trailer may comprise a cable or tether that allows for the trailer as a whole to control its own position relative to the tractor. Alternatively an embodiment may provide speed control of the tractor from the scout robot on the tractor, trailer or boom to eliminate the need to pay out or retract cable to adjust the trailer position. Tractors provide for slow driving speeds and depending on the algorithms used by the scout and harvester robots may not require adjusting the speed of the tractor or distance from the trailer to the tractor. Automatic steering systems may also be employed to eliminate the need for a driver to drive the robots, unless desired at the end of rows or due to safety concerns for example.

Depending on the orchard, or field, the robot may be operating on multiple plants at the same time. In addition to picking across the row as mentioned above, the harvester may pick multiple adjacent trees depending on the spacing and the robot size. This is especially efficient for some crops such as orange trees that are pruned into hedge where it is difficult to distinguish the branches of different trees.

Because the robot task specific robots may be wide relative to the rows between the plants, it may require some arms extended in front of the base to operate on the plants before the base is adjacent to the plant. Without these arms, the base may damage the fruit as it passes by or its presence may prevent the other arms from being able to reach the adjacent fruit.

FIG. 1 illustrates an embodiment of a scout robot. The scout robot comprises a platform shown as "Scout Platform". In addition to being the main robot frame and the base for arms wherein each arm is referenced in FIG. 1 as "Arm", the platform houses the main power components, which may comprise but is not limited to components such as an engine, generator, hydraulic pump, drive train and steering system. All other elements referenced herein in double quotes refer to elements of the respective figure. The platform may also house a computer, a communication device comprising a communications interface such as a cable connector or a wireless communication device and a GPS system. Two "Drive Wheels" may be utilized to propel the robot in one embodiment of the invention. The communications device may be utilized to couple with another robot or server in order to transmit a map of the fruit in a field. This transmission may involve a physical connection such as a cable or be performed via wireless communications. The two drive wheels may be driven independently via individual drive motors. Turning may be accomplished by spinning the drive wheels at different speeds or directions. A third wheel may be utilized as a "Turning Wheel", and may be implemented with a simple free wheeling caster or may be an independently driven wheel. Alternatively, a single engine may drive the drive wheels simultaneously. In this configuration, the turning wheel is free rolling along the ground but is rotated by a steering system along its axis perpendicular to the ground for steering.

Several stereo camera pairs may be located around the perimeter of the platform. These camera pairs are shown in FIG. 1 as "Stereo Cameras Around Robot Body". These cameras enable the robot to view a significant area at all times. The robot may use these cameras to navigate through the fields and to map the fruit and vegetables located near the outside of the plants. A robot may include one or more arms or other mechanical means to move the cameras independently from the motion of the robot base that can be moved into the plant to see the fruit that is not visible by the main body of the robot. These arms may also be used to map the fruit near the top or bottom of the plants. One or more embodiments of the invention utilize a plurality of cameras at an angle offset from horizontal as taught in U.S. Utility patent application Ser. No. 10/710,512, entitled "Angled Axis Machine Vision System and Method" which is hereby incorporated herein by reference.

One method for detecting the fruit is to move the arm back and forth outside of the plant. Optical flow algorithms may be used to detect the fruit during mapping. In this method, the cameras get multiple views of approximately the same portion of the tree from different angles. Viewing an area with slightly different perspective enables the system to determine whether objects move relative to each other in each image, and, thus, their relative locations. Using an optical flow algorithm allows for items inside the canopy to be viewed and mapped without having a direct view of the items at all times. This effect can be observed for example when moving past a picket fence and being able to piece together what is in the entire area behind the picket fence even when unable to do so if stationary in front of the fence. This enhances the systems ability to detect fruit and to determine the coordinates of each piece of fruit. Any other method of determining fruit locations is in keeping with the spirit of the invention.

The actuators and arms may include the minimum number of degrees of freedom to enable them to adequately perform their tasks. Each actuator/arm therefore may include a rotating base shown in FIG. 1 as "Arm Base" in which the upper arm linkage pivots. An elbow joint shown in FIG. 1 as "Elbow" may connect the upper and lower arm linkages and may pivot the lower linkage relative to the upper linkage. A "wrist" pivots and turns a hand-like actuator relative to the lower arm linkage. The hand may include a small stereo camera pair encased in a protective housing and is shown as this embodiment in FIG. 1 as "Hand with Stereo Cameras". The housing is shaped such that it can be moved into and moved out of the canopy of the plant without engaging and significantly damaging either the plant or robot arm. The hand may also include a light to enable the robot to see the fruit within the dark interior of the plant. Each joint includes drive system that may be driven by at least one electric, pneumatic or hydraulic motor or other method such as pneumatic muscles. The motors can either be servos, stepper motors or any motor with position feedback such as encoders. The "arms" further comprise "arm upper linkage" and "arm lower linkage" elements coupled at an "elbow" element. The arms may comprise "arm motors" at any location as long as the motor is capable of moving the arm at the desired joint.

Environmental sensors may be mounted on the robot base, arms or various other linkages and employed in the agricultural robots. These sensors may include moisture sensors, chemical sensors, spectral analysis subsystems, or other agricultural sensors that can be employed in the field to collect data on plant, soil, infestation or other conditions of interest to growers. The scout may position its base, actuators, and linkages or as necessary to collect the samples needed to perform the analyses.

The internal computer and electronics may control the actuators and/or the arm motors as well as navigate the scout through the field or a centralized server may be utilized in order to perform these functions. In addition, task specific robots that are underutilized may be communicated via wireless protocols yielding a peer-to-peer architecture capable of maximizing the processing capability of all harvesters in range of communication. Alternatively wireless communications may be employed between a plurality of robots in order to allow robots with low computational loads to host processing for robots that have higher processing loads. In other words a robot mapping a tree with a small amount of fruit and branches may help a second robot that is currently mapping a heavily laden tree with computational efforts in order to maximize the effectiveness of the system as a whole.

Figure 2:
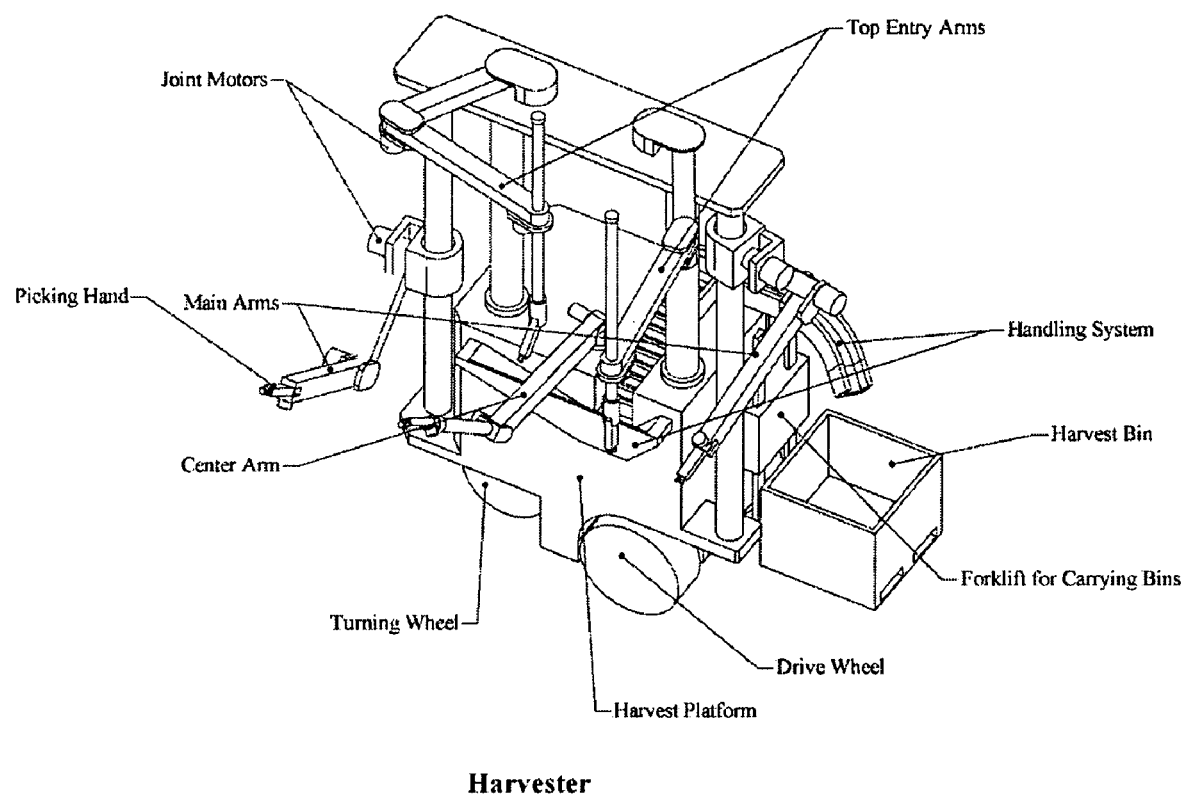
FIG. 2 illustrates an embodiment of a harvester robot.

FIG. 2 illustrates an embodiment of a harvester robot. A harvester robot may be larger than a scout robot. The harvester robot should be of a size that is large enough to allow the harvester robot to reach every piece of fruit in the field. Typically, crops are planted in parallel rows, so from a position next to the plant, the harvester typically is able to reach all the fruit on the half of the plant near the robot. A scout robot may morph into a harvester robot by coupling with at least one harvester bin or alternatively a harvester robot may be used to scout a field before picking.

Like the scout, the platform shown in FIG. 2 as "Harvest Platform" is the main robot body and may include an engine, generator, hydraulic pump, drive train, steering system and other power components. The platform also may house the computer, wireless communication device and a GPS system. The drive system may either incorporate two independently driven drive wheels, shown in the lower left of FIG. 2 as a "Drive Wheel", to propel the robot, or two simultaneously powered drive wheels or any other mechanism, which can move the robot including tracks or rails. The robot may also include a steering system and turning wheel or a free-wheel caster as appropriate in other embodiments of the invention.

The harvester robot may include multiple arms, some of which are specialized to pick certain portions of the plant. For example, "top entry arms" may reach into the plant from the top. A plurality of arms may be coupled with another arm or boom that moves independent of the plurality of arms or that allows one or more arms to move on. This enables the harvester to pick fruit at the top of the tree and to reach into the canopy from the top, which is often the least dense area. The "main arms" slide up and down and can pick the fruit anywhere from the ground to the top of the trees. Other arms, such as the "center arm", reach the most densely packed portion of the plant to speed the harvesting of those regions.

The arms configuration may be nested, where arms are mounted on other arms. For example, two picking arms can be mounted on the base arm hereafter called the boom. The boom might move to a position adjacent to a section of the tree and remain stationary as the picking arms harvest the fruit in that section. The boom is then moved to a new section of the tree and the picking arms harvest the new section. This configuration enables the picking arms, which move almost continuously, to be significantly shorter while still being able to harvest the entire tree. Booms may also be stationary. Arms that are configured to move along the boom (up and down or side to side on the boom depending on the orientation of the boom) may be utilized in one or more embodiments of the invention.

The arm geometry is also affected by the design of the base platform. If the platform is wide, some arms must be located in front of the base in order to harvest the fruit that may either be damaged or blocked by the base platform when it is adjacent to the tree. Each arm has one or more degrees of freedom based on the specific requirements. Actuators, such as electric motors, servos and hydraulic or pneumatic cylinders, may be utilized for each degree-of-freedom (DOF) at each joint.

Figure 7:
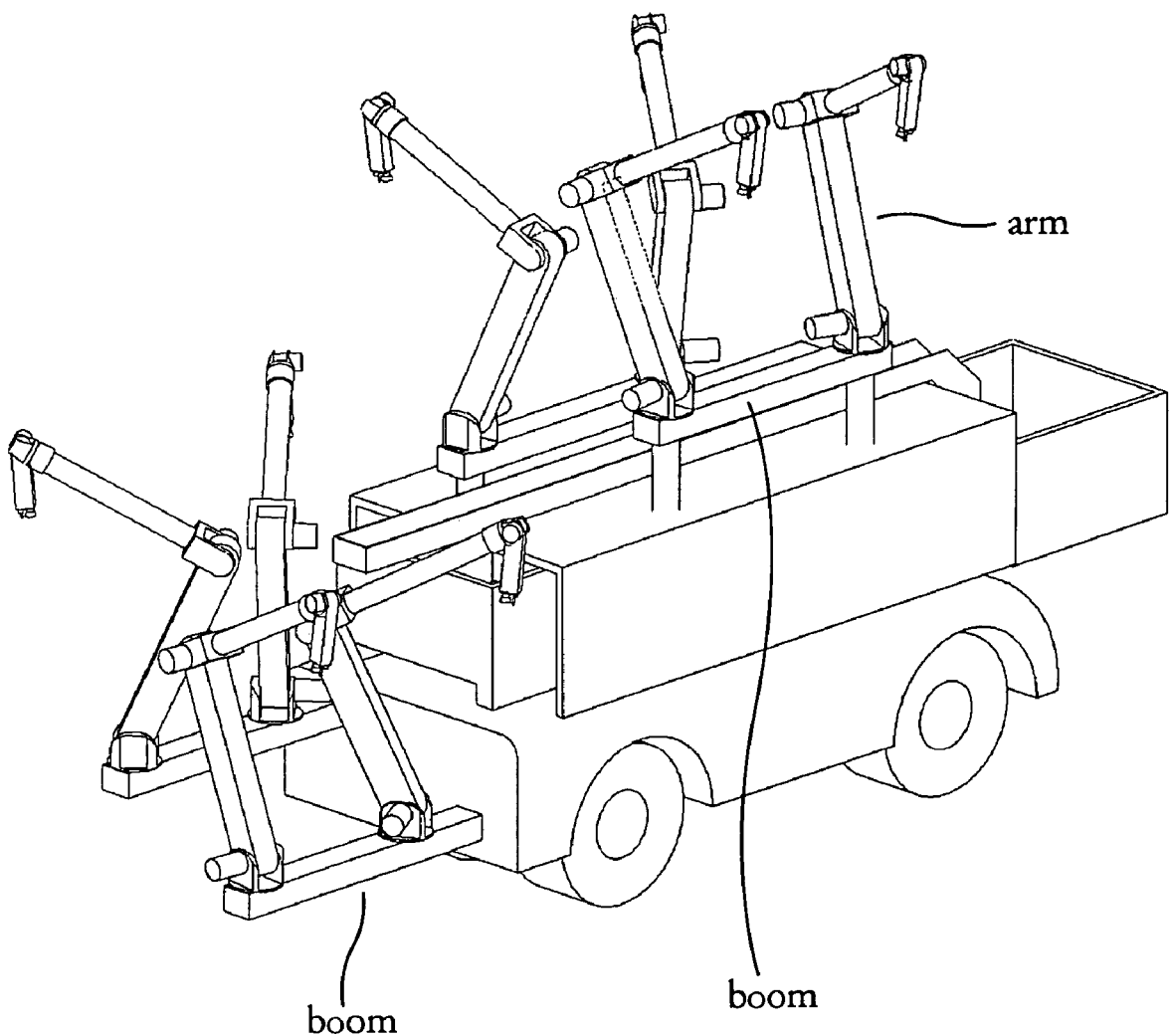
FIG. 7 illustrates an alternative embodiment of a harvester robot.
Figure 8:
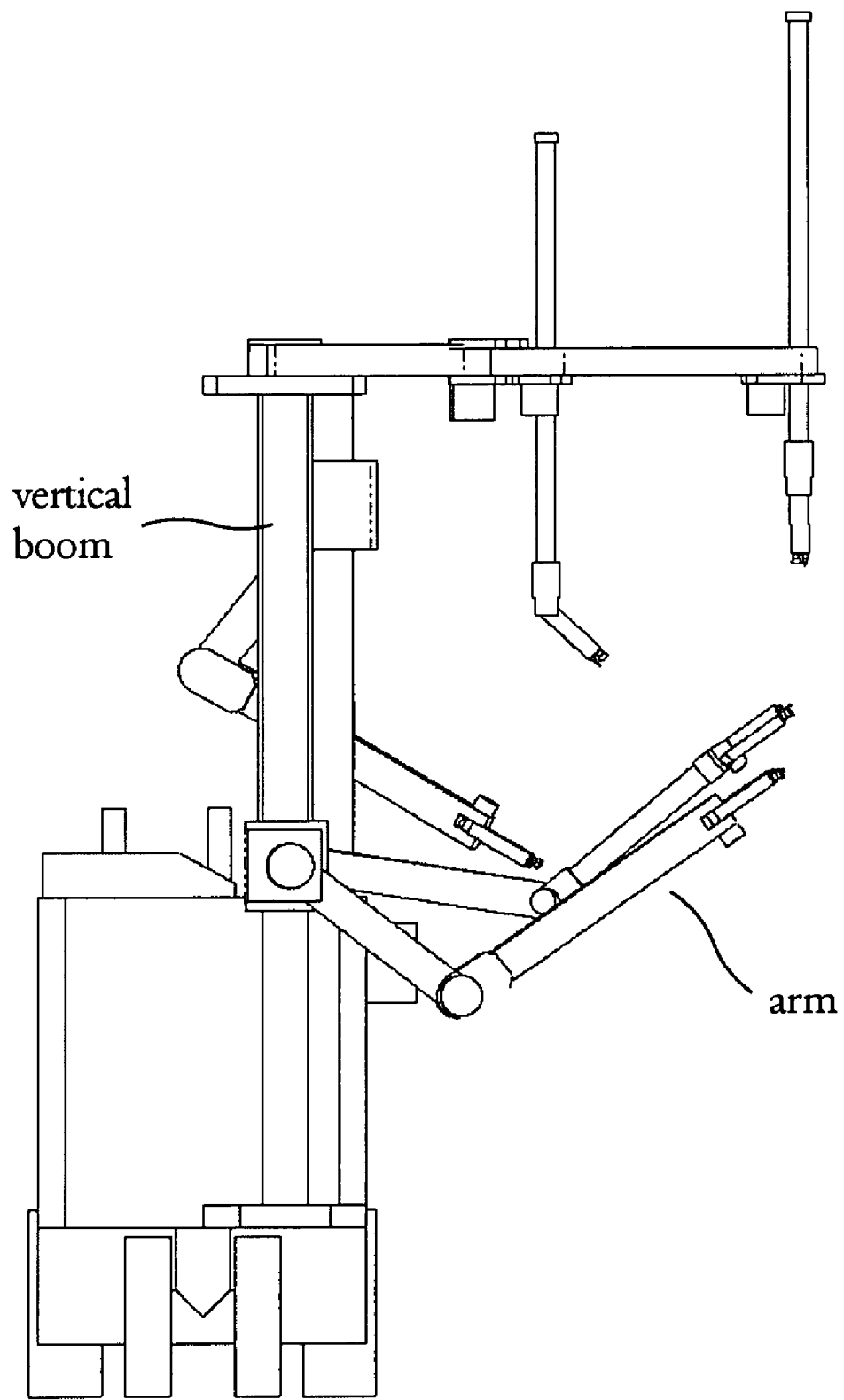
FIG. 8 illustrates a front view of an embodiment of a harvester robot.
Figure 9:
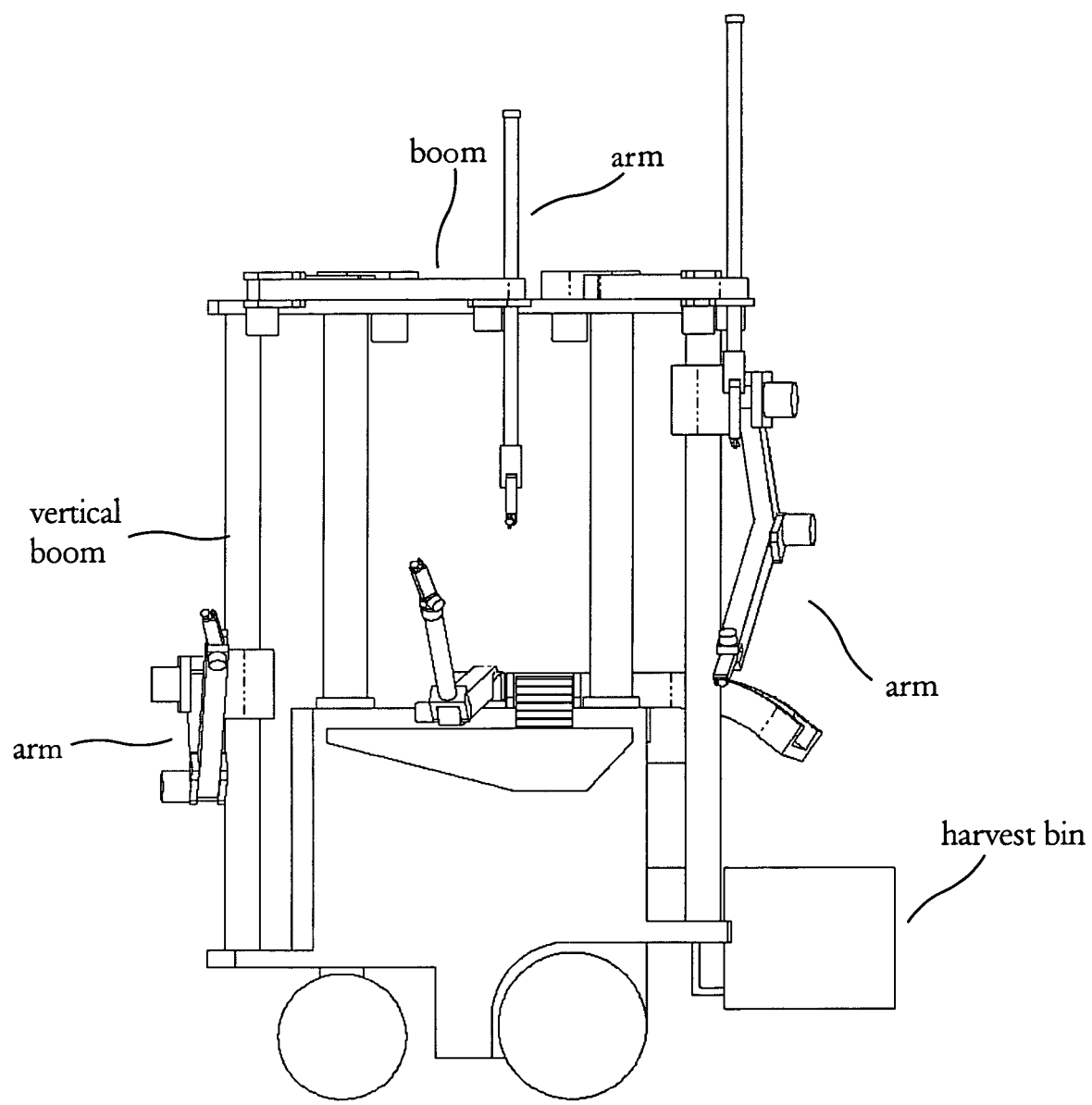
FIG. 9 illustrates a side view of an embodiment of a harvester robot.

FIG. 7 shows an alternate embodiment of a harvest robot. This embodiment comprises an eight arm harvester. A rear mounted "Boom" comprises multiple arms that are mounted higher than front mounted Booms. Each Boom may be raised or lowered which in turn moves any arms coupled to the Boom up or down simultaneously. Other embodiments are configured to allow arms to move along the booms. During harvesting, the bins are placed in the rows approximately as they are expected to be consumed. The robot picks up the empty bin and loads it onto the base platform, which is designed to hold 2-4 to account for the actual yields in the field. Because of the size of the robot base, this harvester model has lower front arms. This model also shows the concept of embedded arms, where two arms are mounted on each boom as described above. FIG. 8 shows a front view of an embodiment of a harvester robot showing a vertical boom and coupled arm and FIG. 9 shows a side view of an embodiment of a harvester robot showing horizontally mounted booms and vertical booms with coupled arms.

As described above, the use of a harvester robot in the examples is for illustrative purposes and does not imply that this invention is strictly for harvesting. Analogous robots performing a pruning, culling, thinning, or spraying sequence or any other function may be utilized in embodiments of the invention. In addition, a single robot may be configured to perform several of these tasks either sequentially or simultaneously. The complete system may include an independent scout robot, utilize the functional task robots to perform the scouting or include scout components and task specific components on a single combination robot.

Figure 10:
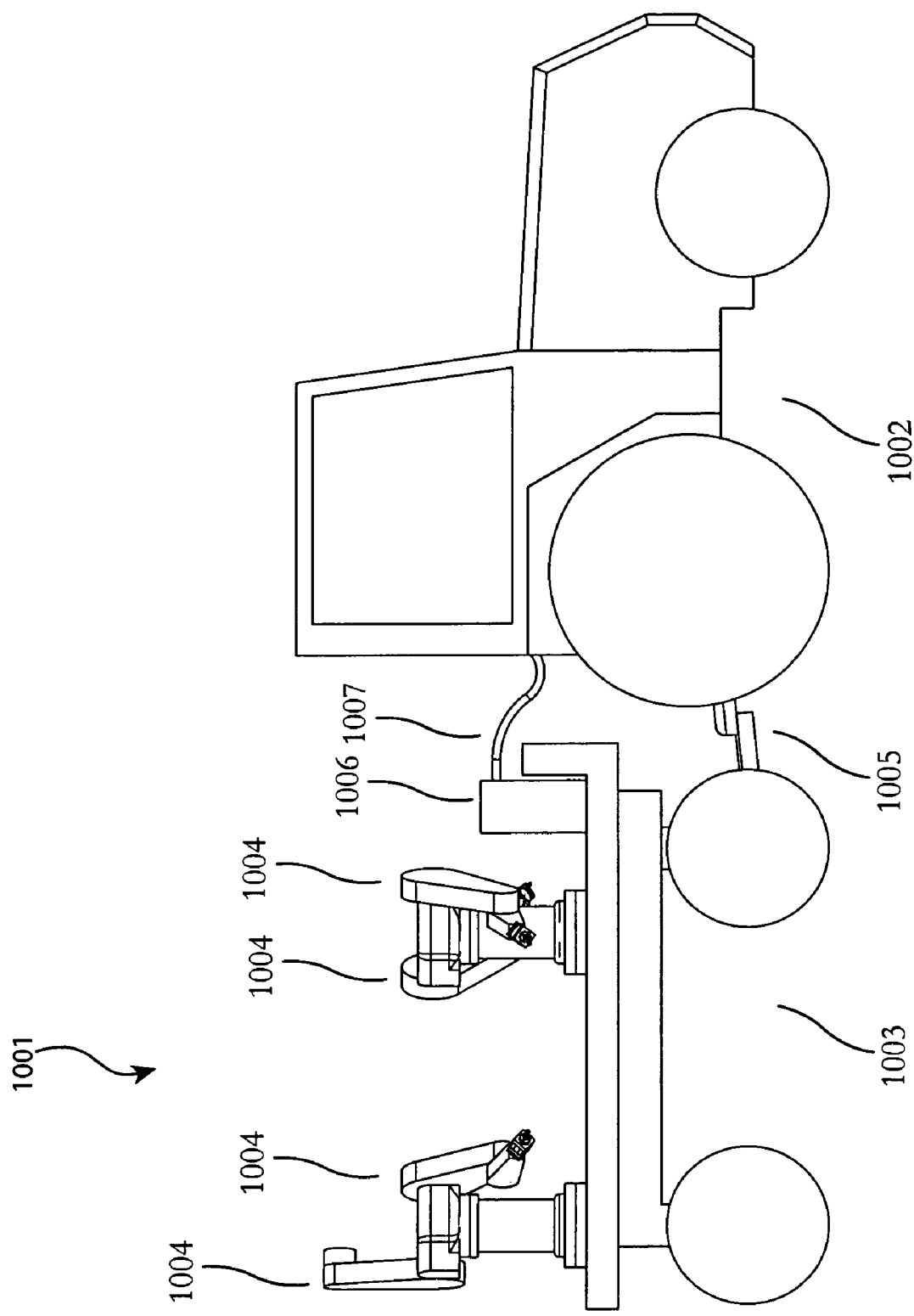
FIG. 10 illustrates an embodiment of a semi-autonomous agricultural robot system.

FIG. 10 illustrates an embodiment of a semi-autonomous agricultural robot system. Agricultural robot system 1001 on trailer 1003 is coupled with hitch 1005 to tractor 1002. Hitch 1005 may comprise a standard trailer hitch (as shown) or a lead screw or cable configured to increase and decrease the distance between tractor 1002 and trailer 1003. Processor system 1006 communicates with tractor 1002 via an electronic tether 1007. Tractor 1002 may be equipped with a hydrostatic or other drive system whose speed can be automatically controlled by processor system 1006. In this embodiment, a driver steers tractor 1002, although the processor system 1006 may control the speed of tractor 1002 and therefore trailer to allow robotic arms 1004 to adequately perform assigned tasks according to an action plan in the shortest time possible. Robotic arms 1004 may be mounted on trailer 1003 and configured to harvest, prune, scout, measure or perform any other agricultural task desired. Alternatively, tractor 1002 may be equipped with a steering system to control the direction of tractor 1002. In this embodiment, the driver may not be present, or may be present for manual override due to safety concerns for example, or to position the system after completing motion in each row of the agricultural area. Without a driver, processor system 1006 may comprise control algorithms allowing for the system to turn around at the end of each row to begin processing the next row.

Figure 11:
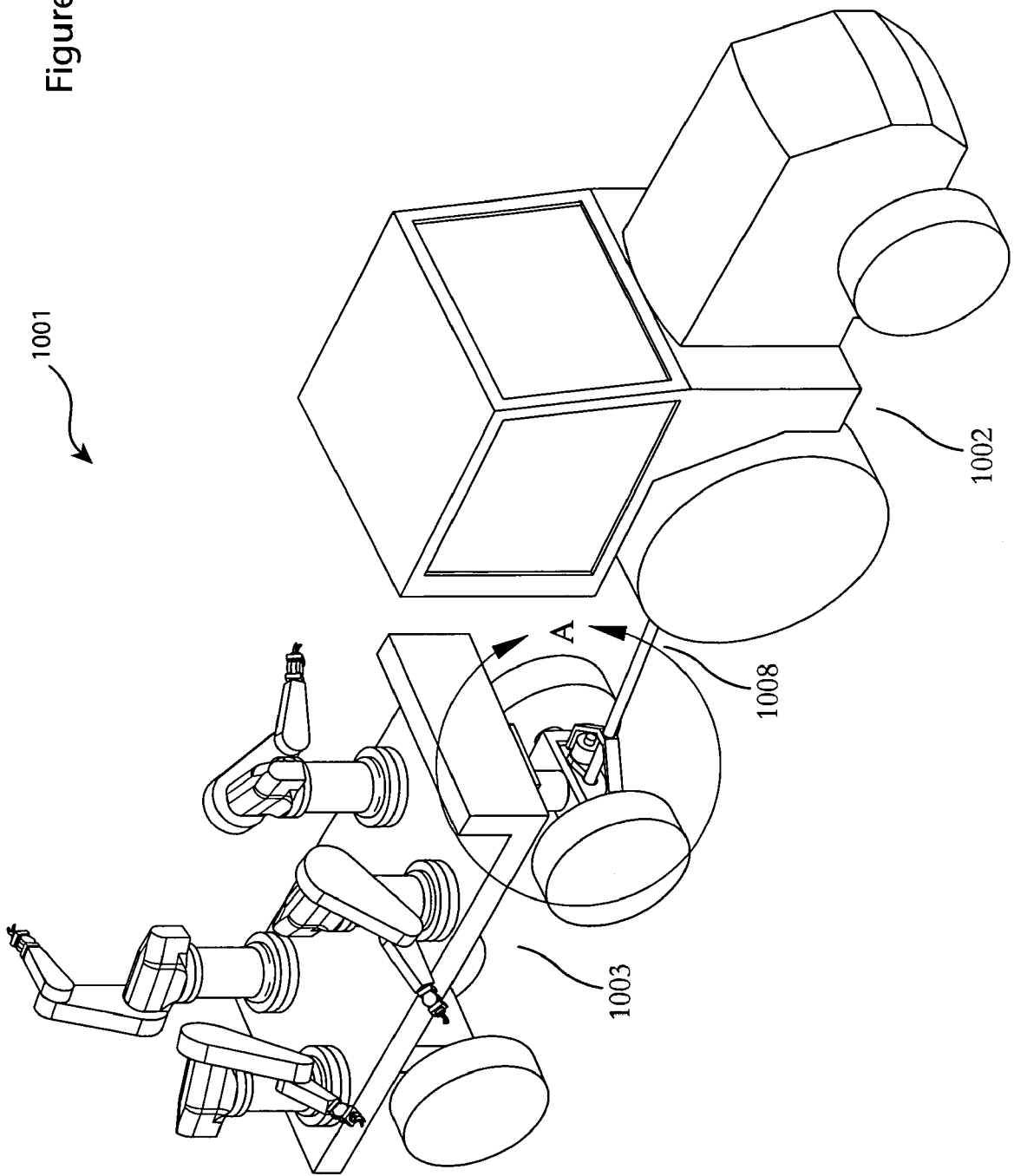
FIG. 11 illustrates an embodiment of a semi-autonomous agricultural robot system comprising an extension link between a trailer and tractor.
Figure 11A:
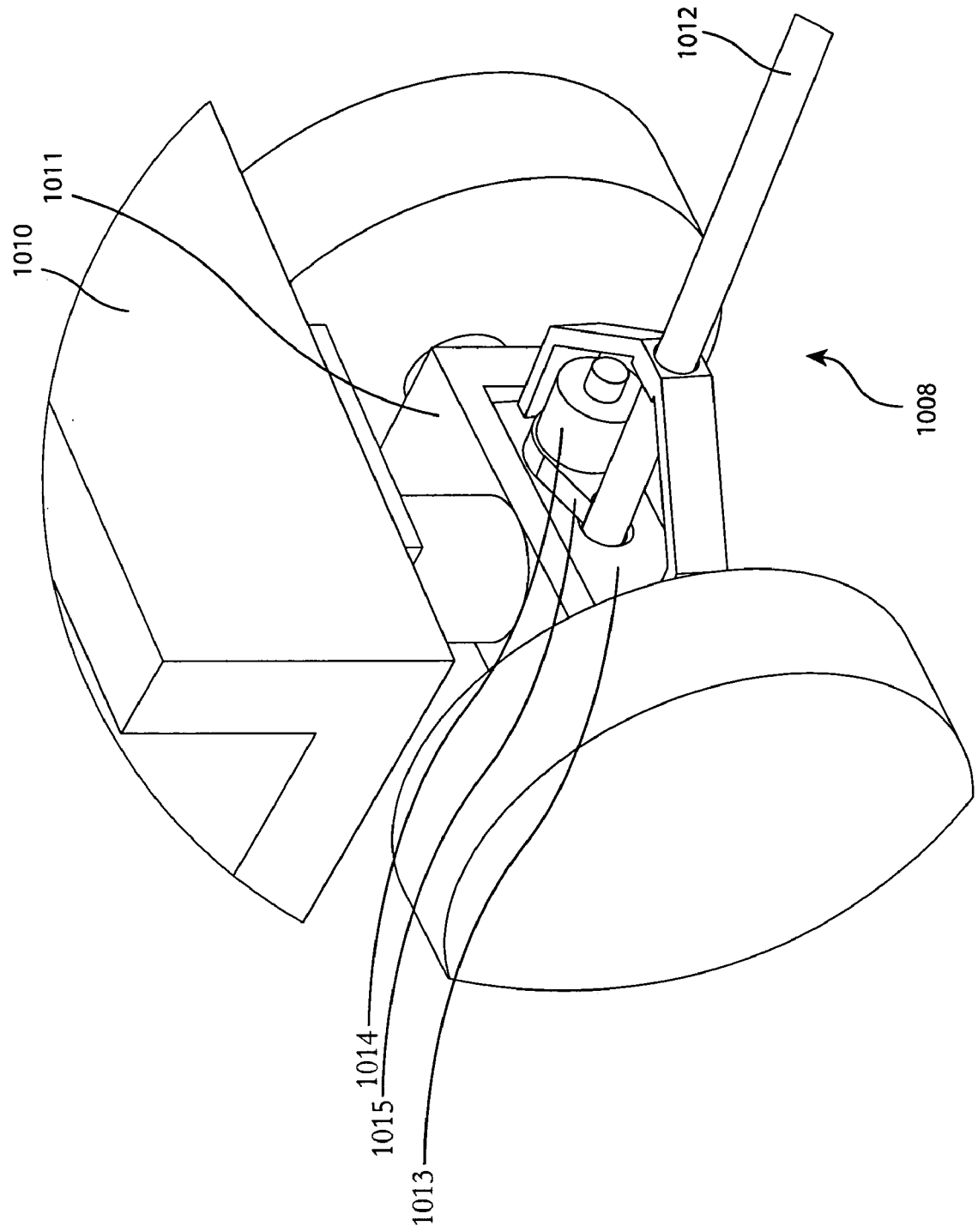
FIG. 11A illustrates a zoom view of circular area A of FIG. 11 showing an embodiment of the extension link comprising a lead screw.

In another embodiment, trailer 1003 housing the robotic arms 1004 may not be able to directly control the speed of the tractor. In such a system, the task may have a known average speed that a driver may maintain, for example in a particular gear at a given throttle setting. However, the picker, pruner, thinner, sprayer, culler, scout or other agricultural robot may need to slow down at times while able to speed up at other times. It is possible to provide a display for the driver that indicates how they should vary their speed. FIG. 11 illustrates an embodiment of a semi-autonomous agricultural robot system that can compensate if the response of the drivers is not fast or accurate enough for the robot to adequately perform its tasks. This embodiment comprising an extension link between a trailer and tractor. One alternative to controlling the speed of the tractor is control the speed of the trailer independently of the tractor. This is accomplished by replacing the standard trailer hitch with extension link 1008 between trailer 1003 and tractor 1002. Rather than being a fixed length link, extension link 1008 may comprise a device enabling the scout to autonomously change its position relative to the tractor, for example a lead screw as shown or a cable. Processor system 1006 extends and collapses extension link 1008 as required enabling the driver to hold the tractor's speed constant at the average work velocity while the robot trailer slows down or speeds up as necessary. If the scout robot travels on average 0.1 miles per hour, or 0.15 feet per second, a 10 foot extension system would enable the robot platform to remain stationary relative to the tree for approximately 1 minute. After the robot passes the center of the tree and approaches the space between the trees, the scouting, pruning, spraying, thinning or picking requirements will likely decrease enabling extension link 1008 to retract. FIG. 11A illustrates a zoom view of circular area A of FIG. 11 showing an embodiment of the extension link comprising a lead screw. Extension link 1008 is mounted to either trailer frame 1010 or wheel assembly 1011 as shown and includes lead screw 1012. In this configuration, lead screw 1012 is hard mounted to the tractor and coupled to hitch frame 1013 via motor 1014 and gear drive 1015. Alternatively, the extension hardware may be coupled with the tractor and the link hard mounted to the trailer. As shown, the configuration has the advantage that robot trailer contains the entire link mechanism and processing system.

Figure 11B:
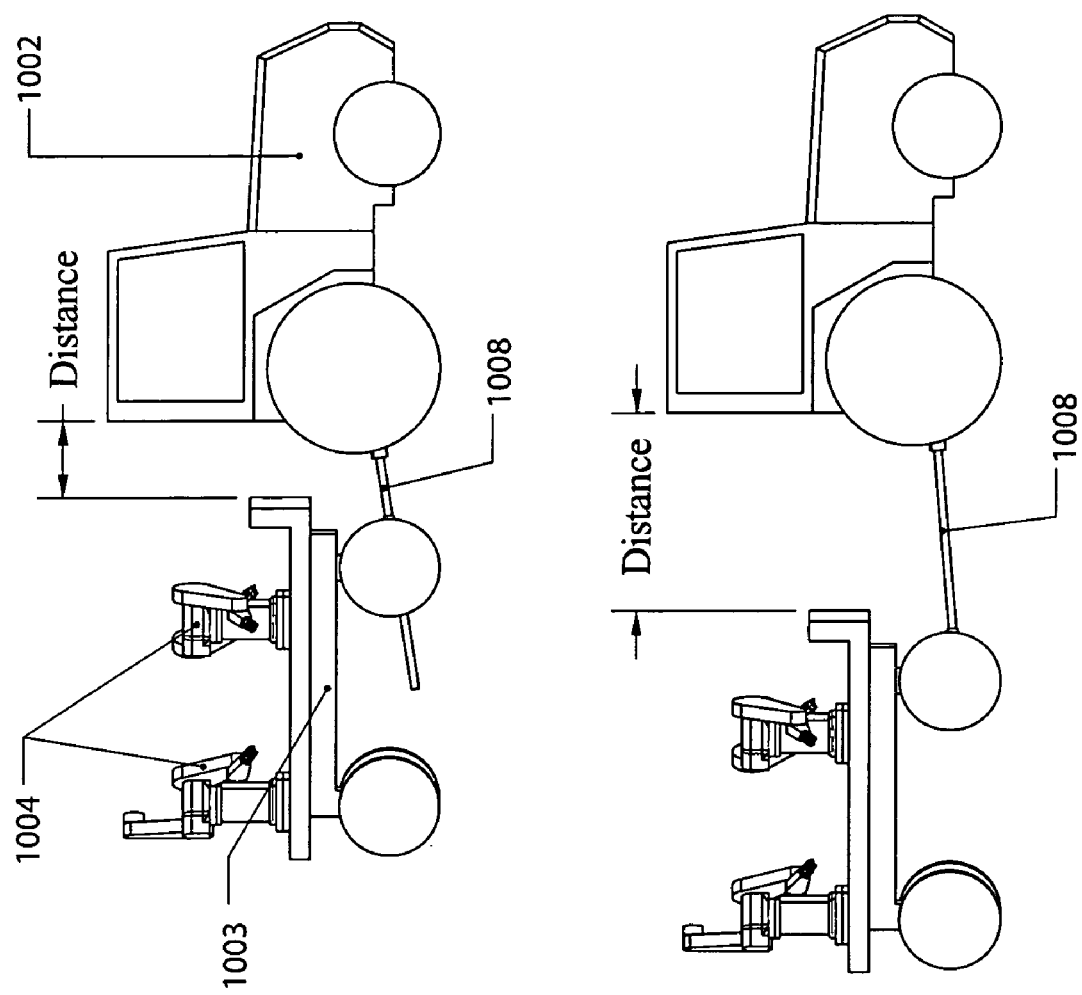
FIG. 11B shows the extension link retracted and extended in the upper and lower portions of the figure respectively.

FIG. 11B shows trailer 1003 in the upper portion of the figure with a distance that is small relative to tractor 1002. The lower portion of the figure shows extension link 1008 extended so that the distance relative to tractor 1003 is greater than in the upper portion of the figure. Extension link 1008 may be configured to pay out 5 meters or more at its maximum extension and be able extend and collapse at the same speed as the tractor. This configuration enables the trailer to stay stationary for short periods of time while the tractor continues to move (which may comprise processor system 1006 engaged one or more brakes on trailer 1003). In this embodiment, a portion of the time the trailer moves slower than the tractor and a portion of the time it moves faster. On average, the semi-autonomous robotic device (also known as an agricultural robotic system) moves the same speed as the tractor. This is desirable, for example, for the tree harvester, scout robot that needs to extend arms into the tree's canopy. If the base of the arm moves while the hand is inside the tree, either the arm or the tree may be damaged.

Figure 11C:
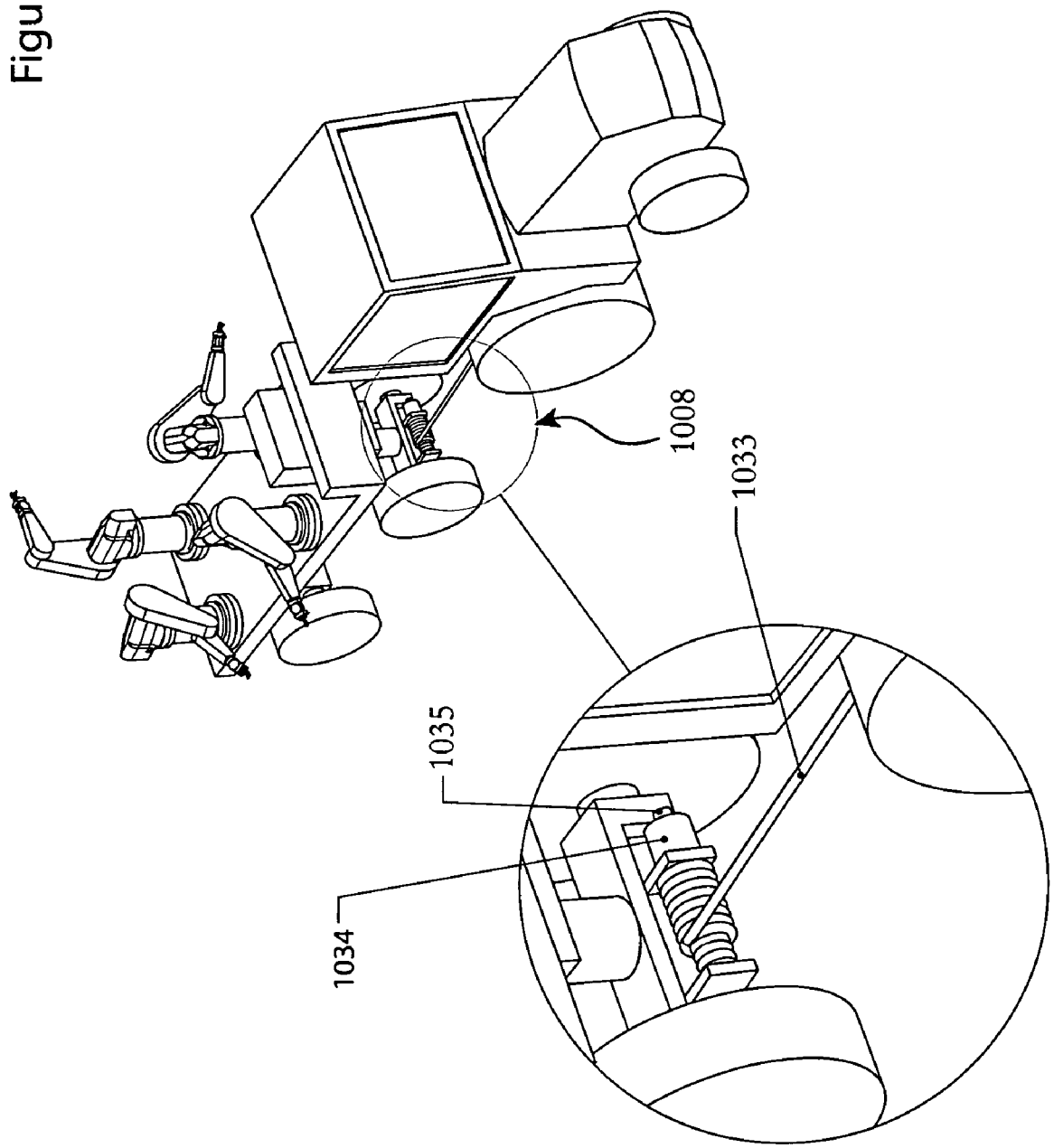
FIG. 11C shows an embodiment extension link that utilizes a cable.

Alternatively, extension link 1008 may be a rack and pinion, rope or chain, or other direct linkage as long as the extension may be speed controlled. FIG. 11C shows an embodiment of the invention utilizing cable 1033 wound on motor driven spool 1034. Encoder or other measuring device 1035 may be utilized to accurately measure and control the speed at which cable is let out or pulled in. This embodiment may utilize the brakes on one or more of the wheels in order to aid in the stopping of the trailer to increase the distance between the tractor and trailer and to hold the trailer's position on uneven terrain. Alternatively, the link could be a long spring. The scout applies brakes to the trailer causing the scout to slow relative to the tractor. When the brakes are released, the spring pulls the trailer back towards the tractor. Manipulation of brakes on downhill slopes allows for the trailer to stop or move in addition to or irrespective of cable movement. Brakes may operate to prevent the trailer from rolling downhill with the use of a flexible coupling element between the trailer and tractor or at other times during use or storage.

Figure 12:
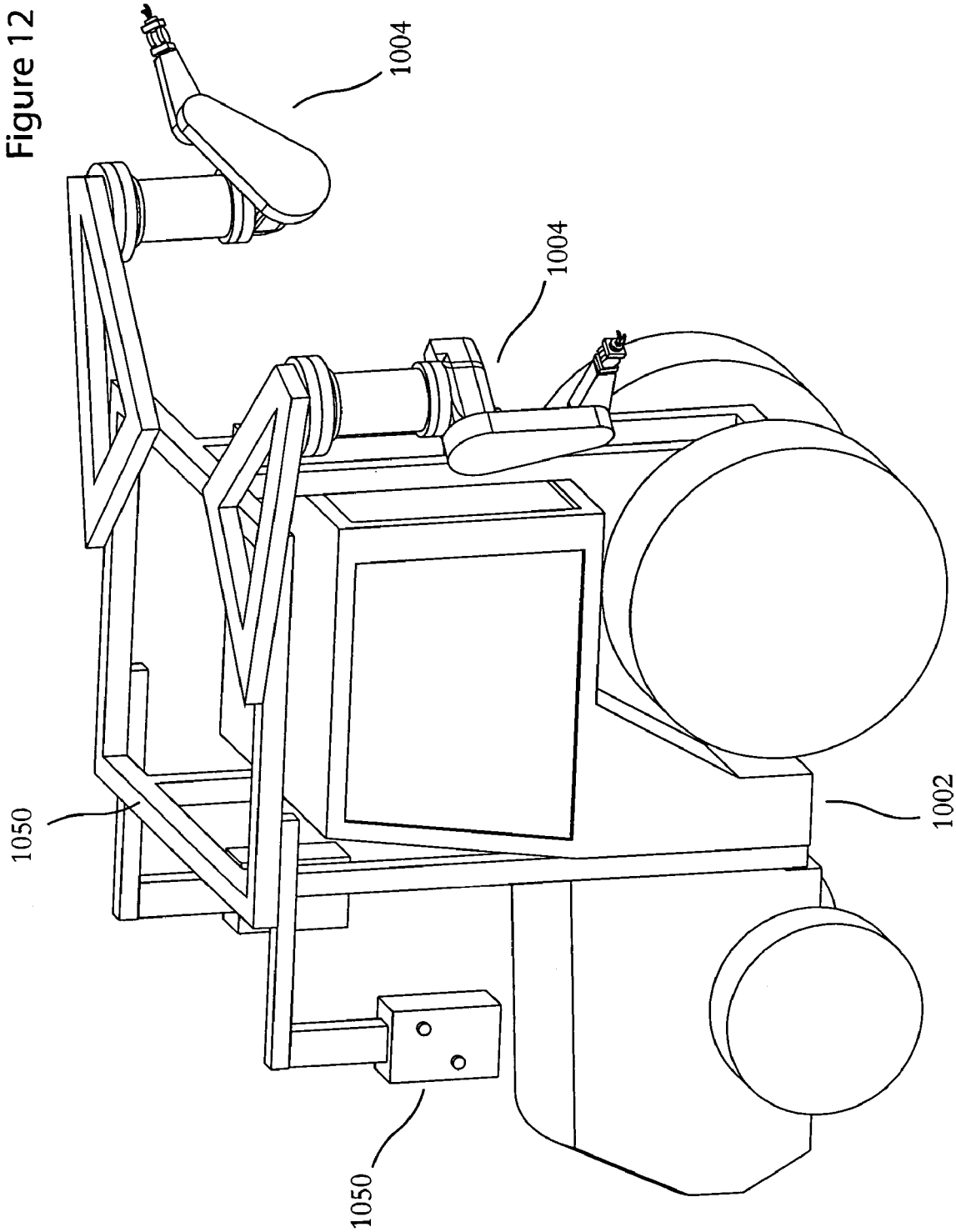
FIG. 12 shows an embodiment of a semi-autonomous agricultural robotic system is directly mounted on the tractor.

FIG. 12 shows an embodiment of the invention wherein the agricultural robotic system is directly mounted on the tractor. Robotic arms 1004 and camera system 1050 are mounted to tractor 1002 on frame 1051. Camera system 1050 may be utilized as a scout. As shown in the figure, it is possible to mount robot systems on either side of the tractor (or trailer) to operate on both sides of the row simultaneously. As shown, camera system 1050 may comprise a plurality of cameras and in addition, the plurality of cameras may be offset from the horizontal to allow for easier distance calculations.

As described in the harvester patent application, the scout and functional robot tasks may be performed by the same device. This is reasonable as long as the scout portion of the system can view, analyze and plan enough of the task to let the functional part of the robot operate efficiently, optimally or in the manner required by the task. In many cases, it is preferable for those tasks to be performed by two robots. In some cases, both the physical and time displacements between the operations enable the same device to perform both functions. Grape vine pruning is an example of the latter. Since typical cordons are only 3-4' long and the processing is not severely intensive, the scout and pruner only need to be 5-6' feet apart, which is small enough to be mounted on the same trailer. The main purpose of scouting/pre-planning a grape vine pruner is to see the entire cordon before pruning the canes. Once the scout has seen the entire cordon, it needs to select the best 8 canes from the 20-30 that are typically present. This analysis may be performed quickly under some scenarios.

Figure 13:
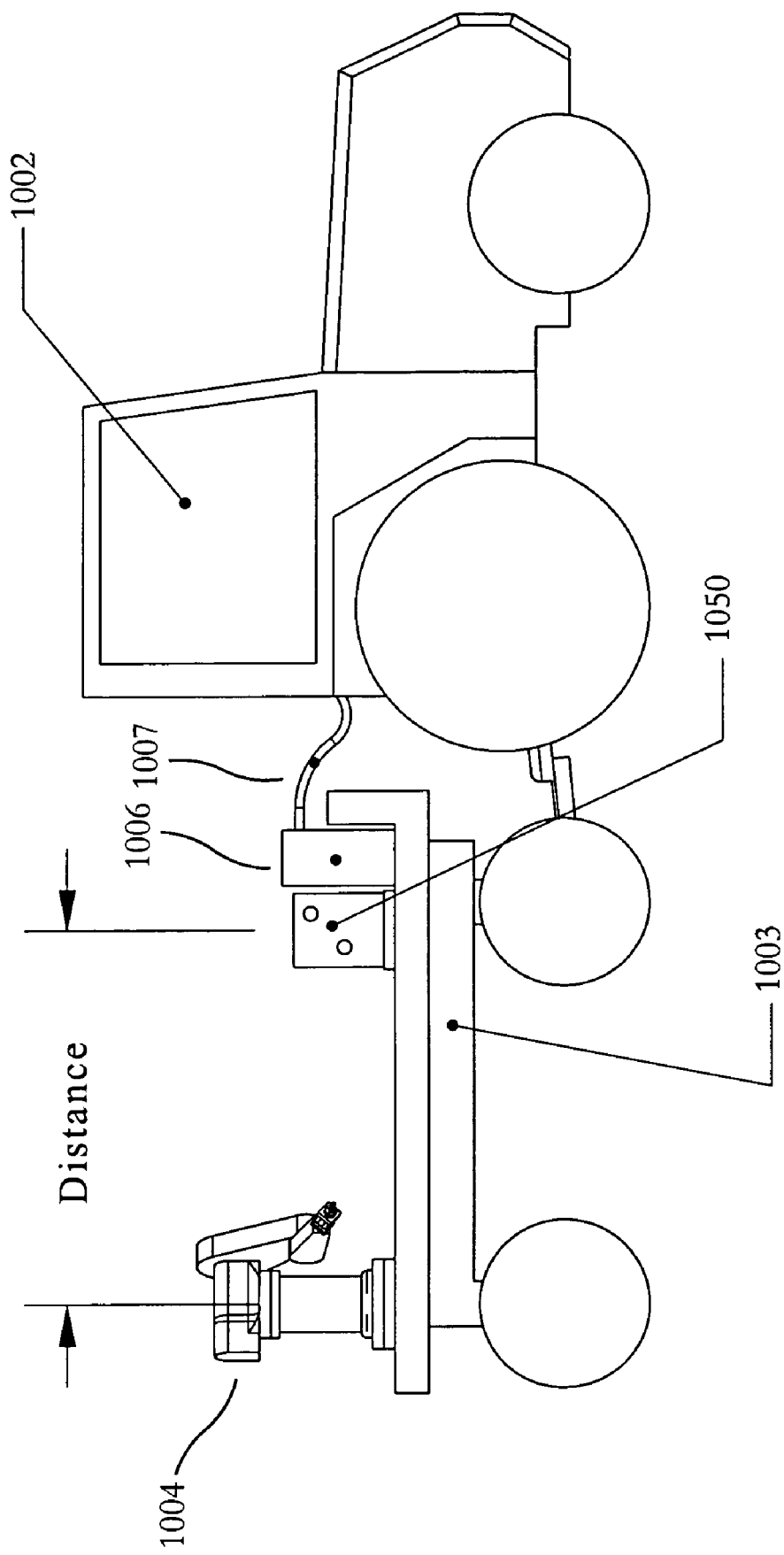
FIG. 13 shows an embodiment of a semi-autonomous agricultural robot system configured for grape vine pruning.

FIG. 13 shows an embodiment of an agricultural robot configured for grape vine pruning. In the figure, the agricultural robot system comprises a standard tractor 1002 pulling trailer 1003 housing the robot functions. The tractor speed is controlled by the processor system 1006, coupled to tractor 1002 via tether 1007. The scout portion of the robot 1050 includes a camera system pointed at the cordon. The figure shows the cameras hard mounted to the trailer, but they may also be controlled to move up-and-down and in-and-out to maintain a better view of the cordon. The scout system may also include multiple cameras or other sensors to maintain a better view of the cordon. The scout system only needs to be mounted the minimum distance in front of functional task portion of the system based on the tractor speed. For the grape vine pruning application, the scout portion may be mounted approximately 2 meters in front of the pruner having robotic arm 1004 depending on the complexity of the pruning algorithm and speed of processor system 1006. The pruner includes a hydraulic trimmer for example. After analyzing the entire cordon, the system is able to prune each cane as it passes it. In this example, the pruning arm will likely also include a vision system enabling it to precisely prune the vine if the system jostles as it moves along the row. The robotic arm and scout may move horizontally on the trailer, or on a boom when needed to perform a prune in one or more embodiments of the system.

Figure 14:
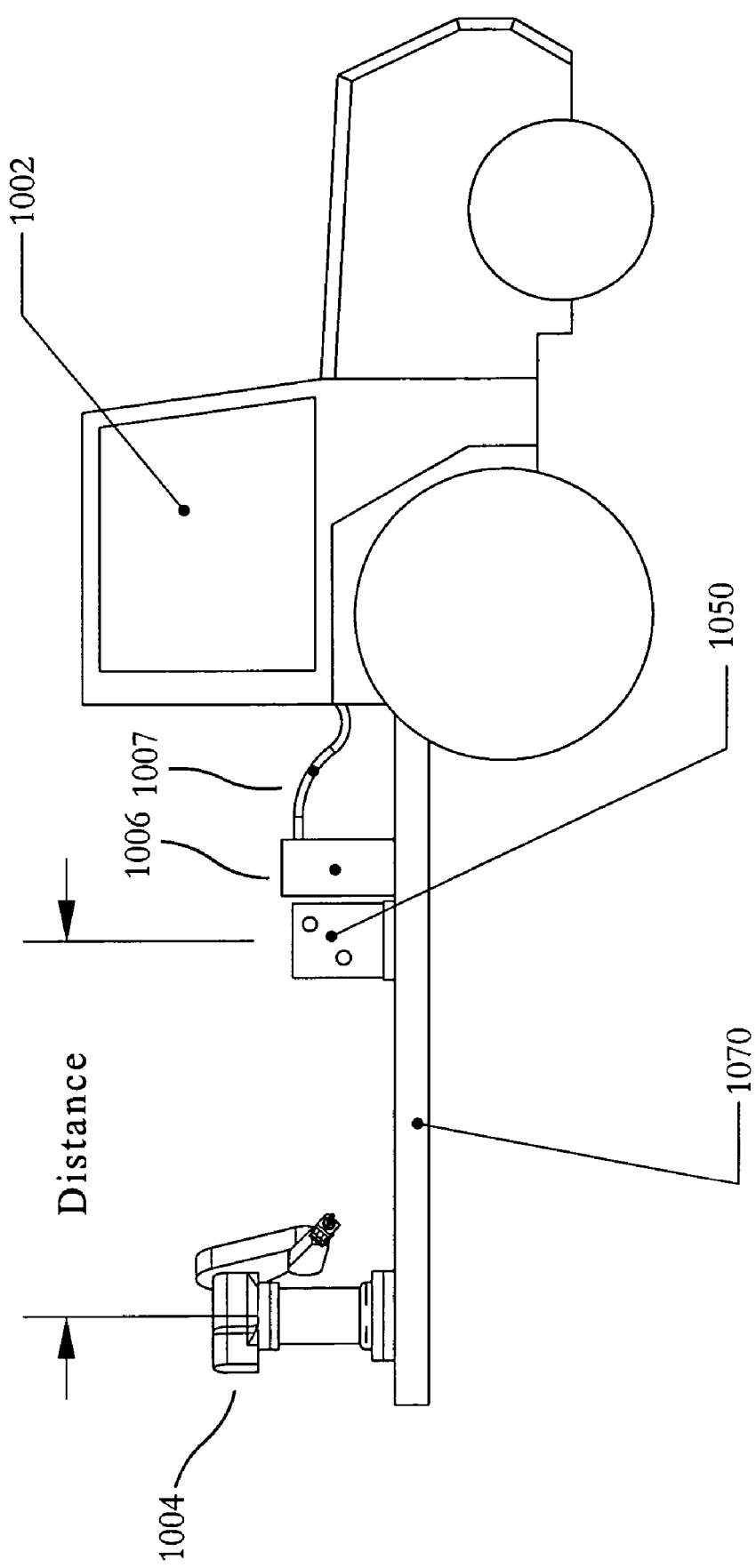
FIG. 14 shows an embodiment of a semi-autonomous agricultural robot system coupled with a boom.

Another embodiment utilizes a rod to mount robots that travel along the rod horizontally in order to speed up and slow down relatively to the tractor. FIG. 14 shows an embodiment of a semi-autonomous agricultural robot system coupled with boom 1070. The worker robot comprising arms and scout which comprises a stereo camera system and no arms in this embodiment are configured to either remain stationary at a fixed distance apart from one another or to travel along boom 1070 in order to remain in one location while the tractor continues to move. Any method of driving the scout and worker robot along the boom are in keeping with the spirit of the invention. The location of the task specific robot and scout may be controlled by a processor system implementing an action plan for example. The boom may be mounted horizontally on the rear of the tractor, horizontally along side the tractor or above the tractor, horizontally in front of the tractor or vertically anywhere about the tractor.

Figure 3:
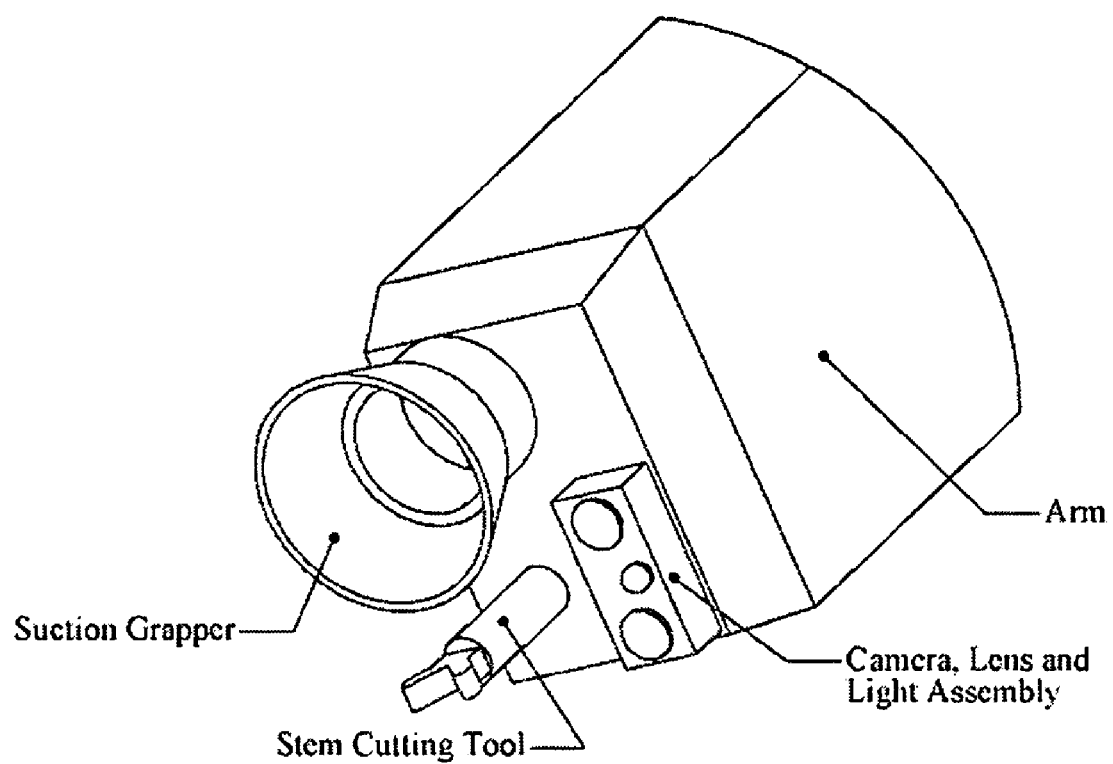
FIG. 3 illustrates an embodiment of a robotic hand.

FIG. 3 illustrates an embodiment of a robotic hand. The hand-type actuator includes a camera and light system to locate and track each piece of fruit as it is picked even the fruit located inside the dark interior of some plants. The grabbing mechanism labeled as "Suction Grabber" may either be a suction cup with an internal vacuum pump as shown or any other grabbing mechanism capable of picking fruit. For fruit whose stems must be cut rather than being pulled off the plant, the hand linkage may comprise an extendable cutter shown as "Stem Cutting Tool".

Once the fruit is picked, the arms deposit the fruit into the "handling system" as illustrated in FIG. 2. The main purpose of the handling system is to transfer the fruit from the arms to the "harvest bin" or bins. The system may also include secondary operations such as a station to wash the fruit or one to trim the stems to a required length. Finally, the handling system deposits the fruit in the crop appropriate bin. In an alternative embodiment, the picking arms may have a hollow center or a tube attached for the picked fruit to roll gently through to the collecting bin.

In addition to filling the hauling bins with the picked fruit, the harvester is configured to pick-up, position, fill and set down the bins. Large, robust fruit is loaded into large bins possibly requiring forklifts to move. The harvester shown in FIG. 2 includes a forklift for picking up bins labeled as "Forklift for Carrying Bins". As with hand labor, a shipping crew places the empty bins where required and picks up the loaded bins in each row for example at the end of the day. The robot picks up a bin, which it loads while harvesting. When the bin is full, the robot lowers it onto the ground and retrieves another bin that had been placed in the field.

In an alternate embodiment the harvester starts by loading 2-3 bins onto the forklift. The robot lowers the bottom bin into the filling position and raises the rest above the handling system. As the robot harvests, it fills the bin and then sets it down on the ground for collection for example at the end of the day. After setting down a filled bin the harvester then repositions an empty bin in the fill position. When it runs out of bins, the harvester moves to the next area where bins are stored and loads the next set of bins.

Figure 4:
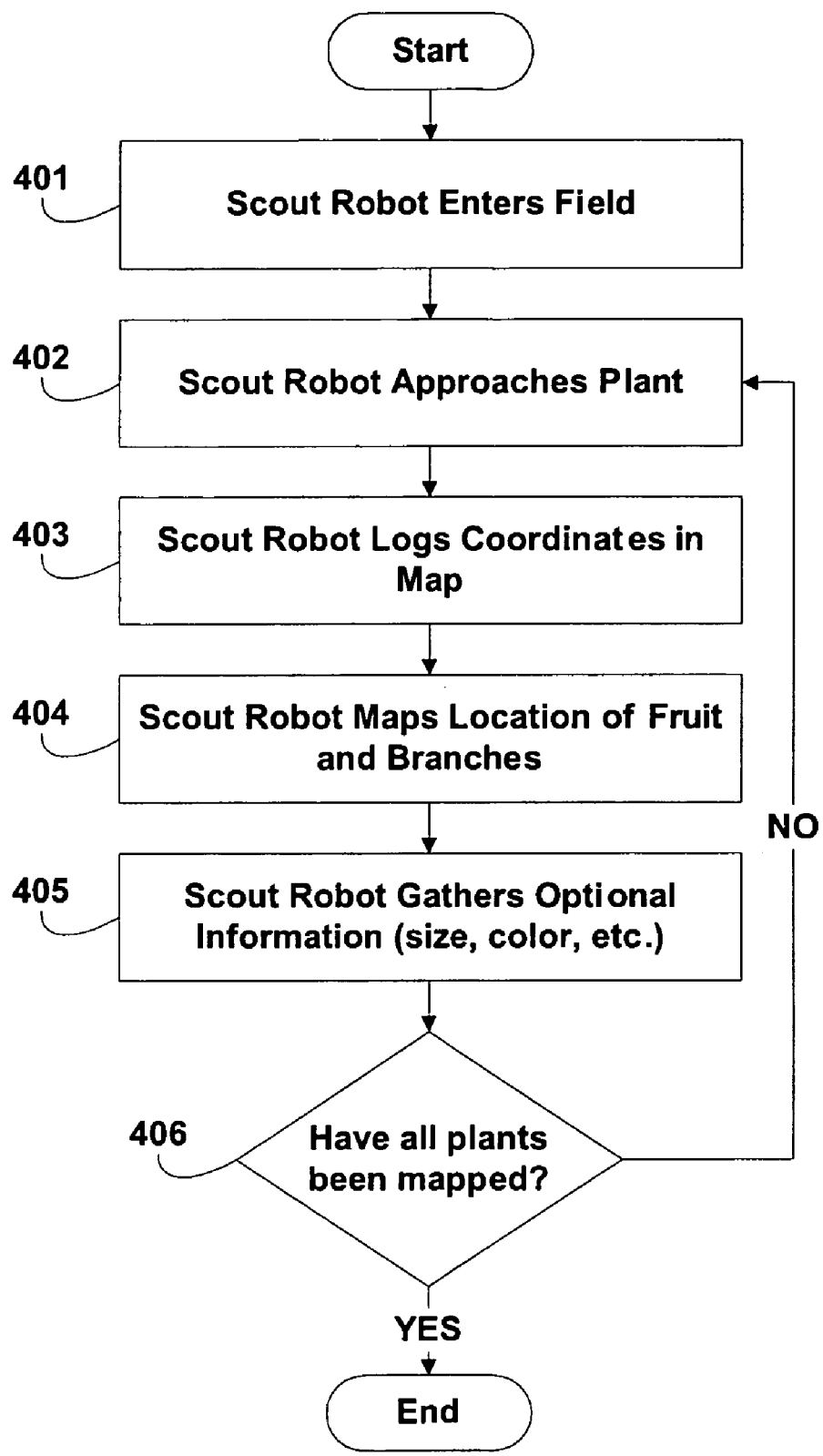
FIG. 4 illustrates an embodiment of a method of mapping locations of plants and fruit via a scout harvester.

FIG. 4 illustrates an embodiment of a method of mapping locations of plants and fruit via a scout harvester. As one skilled in the art of object oriented design patterns will recognize, a design pattern known as a "strategy pattern" may be employed in order to provide dynamic use of alternative strategies without requiring reprogramming or alteration of the software utilized in embodiments of the invention. This may occur for example when a weather system approaches a field and the strategy of waiting for optimal ripeness for harvesting in multiple passes is jettisoned in favor of a pick all fruit immediately strategy in order to save as many agricultural elements as is possible from frost or hail. Any other external event such as a spike in the options market for a given agricultural element may invoke downloads of a new strategy pattern to the robots in the field. Other environmental conditions such as a threshold of a hydration sample or a Brix reading from a refractometer may be used to switch strategies in one or more robots within the field. Any other event that may alter the strategy for scouting or performing various tasks in a field may be used to employ an alternate strategy that may be dynamically loaded and utilized by the robots in the field in keeping with the spirit of the invention. The robot is configured to delineate the field. For example, coordinates for the corners of the field can be provided to the robot or visible landmarks such as posts or fences can be used for this purpose. The scout begins by entering the field at 401 and approaching the first plant at 402. The scout (or harvester as well) may be driven by a human operator or move autonomously depending on the embodiment employed. The robot then logs either its position relative to a landmark or its GPS coordinates in the map at 403. Any other method of determining a position is in keeping with the spirit of the invention. The scout then moves around the plant looking at the exterior with both the cameras mounted on the platform and/or those on the arms, linkages and/or various actuators at 404. While it is examining the plant, it is looking for fruit and thick branches. This information is used to determine areas where both the scouting and task specific arms may be moved inside the canopy of the plant. The scouting arms may then moved into the canopy of the tree to map the fruit on the inside of the plant. For plant types with fruit exclusively on the outside of the plant such as a tomato plant, this step may not be performed. In addition, the scout may gather information such as the size or ripeness of each piece of fruit at 405.

When the scout completes the map for the first plant, it moves down the row to explore the next. This process continues until the determination whether all the plants in the field have been mapped at 406. This process may utilize multiple scouts that may or may not communicate with a central server or with the other scouts in order to divide and conquer the mapping area. Once a field is mapped that map is saved for future use, either in the same or successive growing seasons. The scout is configured to update the map for removed or added plants.

Figure 5:
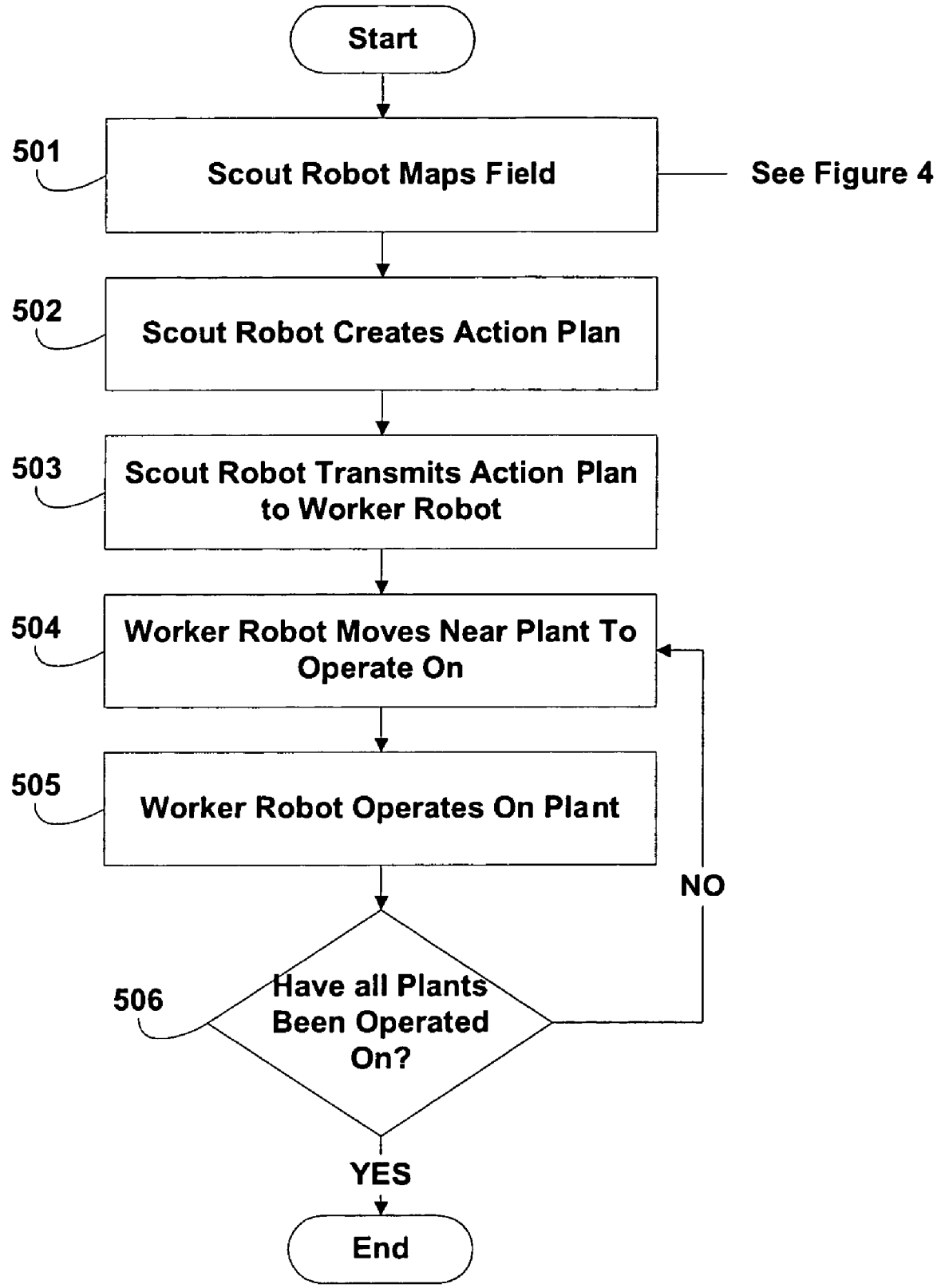
FIG. 5 illustrates an embodiment of a method of harvesting fruit with a harvester robot using a picking plan generated via a scout robot.

FIG. 5 illustrates an embodiment of a method of harvesting fruit with a harvester robot using a picking plan generated via a scout robot. First the scout maps the field at 501 as per FIG. 4. From the map, the scout creates a picking plan that includes the worker robot's path of travel through the field with details including the locations where the harvester is to stop around each plant at 502. The plan may include the order of fruit to pick with each arm and the approximate arm motions to reach each piece. Once the plan is complete, the scout transmits it to the appropriate worker at 503 (or to a server). Alternatively, the scout robot may merely transmit the map to a worker robot or server where the action plan is calculated and coordination between a plurality of worker robots is performed. Use of the system without a centralized server comprises a peer-to-peer architecture. The peer-to-peer architecture may be used in order to balance processing loads of the various robots depending on their current work load in order to most efficiently utilize their associated computing elements. Any algorithm for an action plan may be used in the strategy pattern in keeping with the spirit of the invention.

When it is time to operate in a field the worker implements the action plan to operate on the plants in the field. The operation implemented may involve picking, pruning, culling, thinning, spraying weeding or any other agricultural function. It positions itself as directed around each plant at 504. It then moves its actuators to locate the intended item as directed in the plan. Once the actuator is looking approximately at the target location, the various camera(s) locates and operates on the item at 505, for example in one embodiment of the strategy pattern, the easiest piece of fruit to harvest. The actuator or arm is positioned to operate on the next intended item associated with the plant, then it moves to the next item location and the process continues until the entire plant is operated on. In one embodiment of the strategy pattern after picking a piece of fruit for example the distance of the fruit from the core of the tree may be utilized to estimate the amount of height gained by the remaining pieces of fruit in a cluster as the branches farther away from the center of the tree may be smaller for a given tree type and therefore exhibit a relationship of group location as a function of distance from the center of the plant.

Once the first plant is operated on, the robot moves itself to the proper position near the second plant and the process is repeated. This continues until the determination is made whether the entire field is operated on at 506. Alternatively, the scout may transmit the action plan for each plant to the task specific robot after mapping each plant changing the target of the "NO" event originating from 506 to 502 instead of 504.

Figure 6:
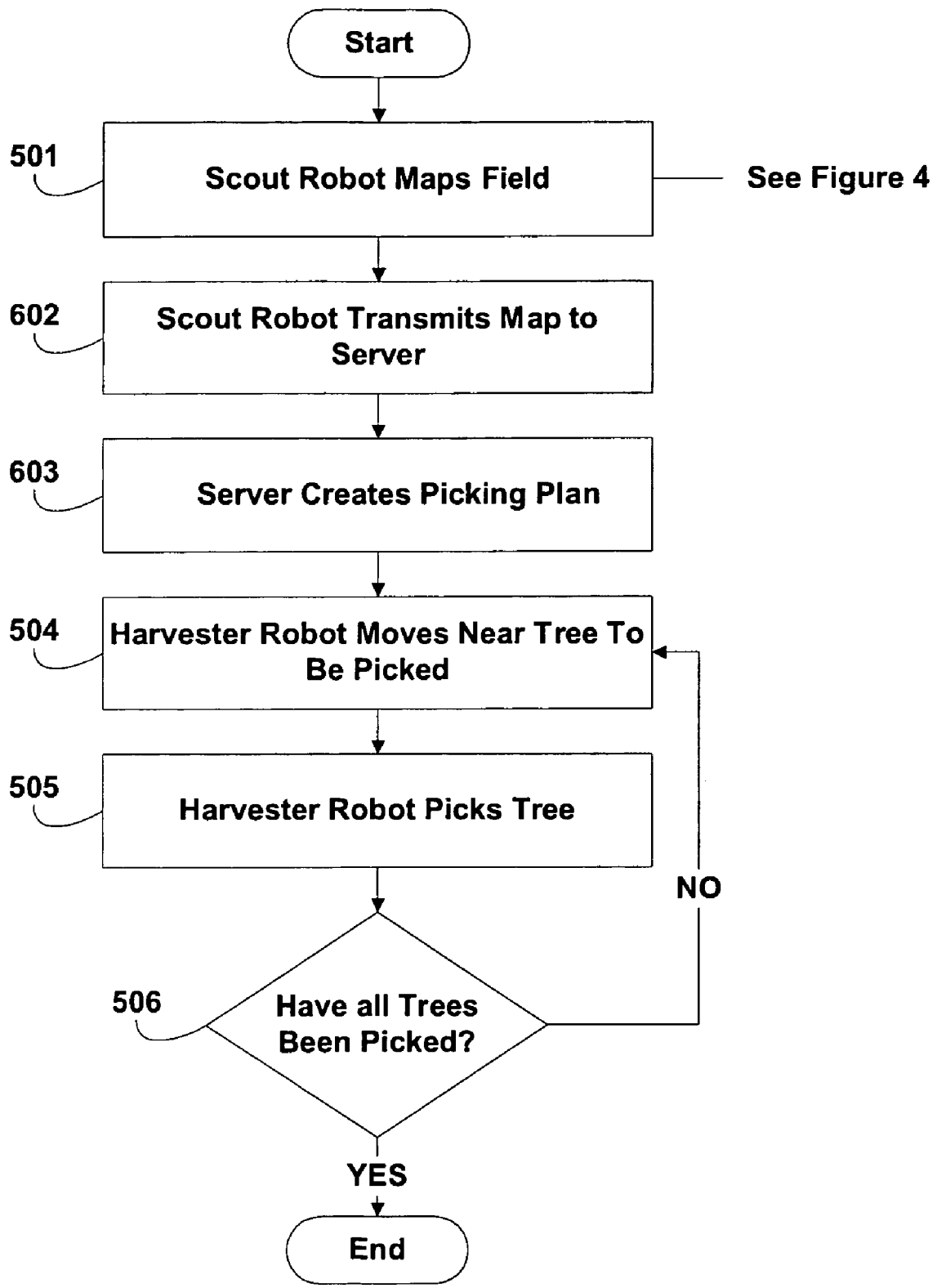
FIG. 6 illustrates an embodiment of a method of harvesting fruit with a harvester robot using a picking plan generated via a server using a map created by a scout robot.

FIG. 6 illustrates an embodiment of a method of harvesting fruit with a harvester robot using a picking plan generated via a server using a map created by a scout robot. First the scout maps the field at 501 as per FIG. 4. From the map, the scout transmits the map to a server at 602. The server creates a picking plan that includes the harvester robot's path of travel through the field with details including the locations where each harvester is to stop around each plant. The plan may include the order of fruit to pick with each arm and the approximate arm motions to reach each piece. Once the plan is complete, the server transmits it to the appropriate harvester at 603. Alternatively, the scout robot may merely transmit the map to a harvest robot where the picking plan is calculated and coordination between a plurality of harvest robots is performed. Use of the system without a centralized server comprises a peer-to-peer architecture. The peer-to-peer architecture may be used in order to balance processing loads of the various robots depending on their current work load in order to most efficiently utilize their associated computing elements. Any algorithm for a picking plan may be used in the strategy pattern in keeping with the spirit of the invention.

When it is time to pick that field the harvester implements the picking plan to harvest the fruit. It positions itself as directed around each plant at 504. It then moves its arms to locate the fruit as directed in the plan. Once the hand is looking approximately at the target location, the camera on the hand locates and picks the fruit at 505, for example in one embodiment of the strategy pattern, the easiest piece of fruit to harvest. The arm is positioned to pick the next piece of fruit in the bunch, then it moves to the next fruit location and the process continues until the entire plant is harvested. In one embodiment of the strategy pattern after picking a piece of fruit for example the distance of the fruit from the core of the tree may be utilized to estimate the amount of height gained by the remaining pieces of fruit in a cluster as the branches farther away from the center of the tree may be smaller for a given tree type and therefore exhibit a relationship of group location as a function of distance from the center of the plant.

Once the first plant is harvested, the harvester moves itself to the proper position near the second plant and the harvesting process is repeated. This continues until the determination is made whether the entire field is harvested at 506. Alternatively, the scout may transmit the picking for each tree to the harvester after mapping each tree changing the target of the "NO" event originating from 506 to 602 instead of 504.

Thus embodiments of the invention directed to an Agricultural Robot System and Method have been exemplified to one of ordinary skill in the art. The claims, however, and the full scope of any equivalents are what define the metes and bounds of the invention.

What is claimed is:

1. An agricultural robot system comprising:
   a scouting robot programmed to autonomously scout an agricultural field without operator intervention comprising at least one camera, wherein said scouting robot is programmed to:
      autonomously move to a first grapevine in said agricultural field;
      use said at least one camera to obtain data associated with agricultural elements of said first grapevine, wherein said data is geo-referenced;
      autonomously move to a second grapevine in said agricultural field;
      use said at least one camera to obtain data associated with agricultural elements of said second grapevine, wherein said data is geo-referenced;
   at least one computer programmed to generate a pruning plan using said data associated with agricultural elements of said first grape vine and said data associated with agricultural elements of said second grapevine, said pruning plan comprising:
      locations of pruning sites to prune in said first grapevine and said second grapevine, wherein said pruning sites are determined using said data associated with agricultural elements of said first grapevine and said data associated with agricultural elements of said second grapevine;
      a pruning order for said pruning sites;
      a first grapevine location;
      a second grapevine location;
      a robot motion path based on said first grapevine location and said second grapevine location; and
      at least one robot arm motion path, wherein each robot arm motion path is based on said location of pruning sites and any other potentially interfering robot arm motion paths, wherein said at least one robot arm motion path is programmed to minimize a path entanglement risk;
   a pruning robot programmed to autonomously prune said agricultural field without said operator intervention comprising:
      at least one arm programmable to autonomously move according to said at least one robot arm motion path;
      a platform coupled with said at least one arm; and
      a drive wheel coupled with said platform programmable to autonomously move said pruning robot according to said robot motion path;

wherein said scouting robot does not perform an agricultural operation that transforms said agricultural elements of said first or said second grapevines within said agricultural field;

wherein said pruning robot is programmed to prune said first grapevine and said second grapevine at said pruning sites according to said pruning plan.

2. The system of claim 1 further comprising at least one actuator coupled with said at least one arm, wherein said at least one actuator is programmed to interact with said agricultural elements in said agricultural field to prune said agricultural elements.

3. The system of claim 1 wherein said at least one camera is coupled with an actuator.

4. The system of claim 1 wherein said at least one camera produces a plurality of images that are processed by an optical flow algorithm.

5. The system of claim 1 wherein said at least one camera comprises a plurality of cameras programmed to provide stereo vision.

6. The system of claim 1 further comprising an object selected from the group consisting of GPS, communications device, sensor, refractometer, hydration sensor, at least one harvester bin, and a server; wherein said object is coupled with said at least one platform or with an actuator that is coupled with said at least one mobile platform.

7. The system of claim 2 wherein said at least one actuator comprises a light source and wherein said light source is utilized to illuminate said agricultural elements in said agricultural field.

8. The system of claim 2 further comprising a harvest bin.

9. The system of claim 1 further comprising a server wherein said server is programmed to create said pruning plan associated with said agricultural field.

10. The system of claim 9 further comprising a communications device programmed to communicate between a processor associated with said scouting robot and said server.

11. The system of claim 1 wherein said scouting robot is programmed to scout said agricultural field before a pruning or during a pruning of said agricultural field.

12. The system of claim 1 wherein said pruning robot is programmed to process a first agricultural element selected from said agricultural elements after said first agricultural element is picked.

13. The system of claim 12 wherein said process comprises an action selected from the group consisting of cleaning, packaging, and removing stems.

14. The system of claim 1 further comprising an agricultural database which comprises a map and agricultural element health or environment status of said agricultural field.

15. The system of claim 1 further comprising an agricultural database that is used to estimate crop yield or improve farming techniques.

16. The system of claim 1 wherein said scouting robot transmits said pruning plan to said pruning robot.

17. The system of claim 1, wherein said robot motion path is further based on said at least one location of pruning sites.

* * * * *